United States Patent
Ma et al.

(10) Patent No.: US 12,096,360 B2
(45) Date of Patent: Sep. 17, 2024

(54) SIGNALING PROCESSING METHOD AND APPARATUS, TERMINAL, AND STORAGE MEDIUM

(71) Applicant: ZTE Corporation, Guangdong (CN)

(72) Inventors: Xuan Ma, Guangdong (CN); Mengzhu Chen, Guangdong (CN); Jun Xu, Guangdong (CN); Focai Peng, Guangdong (CN); Qiujin Guo, Guangdong (CN); Xiaoying Ma, Guangdong (CN)

(73) Assignee: ZTE Corporation, Shenzhen (CN)

( * ) Notice: Subject to any disclaimer, the term of this patent is extended or adjusted under 35 U.S.C. 154(b) by 364 days.

(21) Appl. No.: 17/737,879

(22) Filed: May 5, 2022

(65) Prior Publication Data
US 2022/0369227 A1    Nov. 17, 2022

Related U.S. Application Data

(63) Continuation of application No. PCT/CN2020/126517, filed on Nov. 4, 2020.

(30) Foreign Application Priority Data

Nov. 8, 2019   (CN) .......................... 201911090300.2

(51) Int. Cl.
*H04W 52/02*    (2009.01)
*H04W 76/28*    (2018.01)

(52) U.S. Cl.
CPC ....... *H04W 52/0225* (2013.01); *H04W 76/28* (2018.02)

(58) Field of Classification Search
CPC ............. H04W 52/0225; H04W 76/28; H04W 52/0216; H04W 52/0274; H04W 52/0235; H04W 72/0453; H04W 52/0229; H04L 5/001; H04L 5/0053; H04L 5/0098; Y02D 30/70

See application file for complete search history.

(56) References Cited

U.S. PATENT DOCUMENTS

| | | | |
|---|---|---|---|
| 2018/0183551 A1* | 6/2018 | Chou | ................... H04W 72/044 |
| 2019/0124558 A1* | 4/2019 | Ang | ........................ H04L 5/001 |
| 2020/0337051 A1 | 10/2020 | Chang et al. | |
| 2021/0368367 A1 | 11/2021 | Jiang et al. | |
| 2022/0210866 A1* | 6/2022 | He | ........................ H04L 5/0048 |

FOREIGN PATENT DOCUMENTS

| | | |
|---|---|---|
| CN | 106301721 A | 1/2017 |
| CN | 109392136 A | 2/2019 |
| CN | 109963326 A | 7/2019 |

(Continued)

OTHER PUBLICATIONS

Australian Notice of acceptance for patent application issued in AU Patent Application No. 2020378123, dated Nov. 22, 2023, 3 pages.

(Continued)

*Primary Examiner* — Walli Z Butt
(74) *Attorney, Agent, or Firm* — Perkins Coie LLP

(57) ABSTRACT

Provided are a signaling processing method and apparatus, a terminal and a storage medium. The method includes a terminal receives first signaling, and operates on a bandwidth part (BWP) of a serving cell according to the first signaling.

16 Claims, 2 Drawing Sheets

(56) References Cited

FOREIGN PATENT DOCUMENTS

| CN | 111092709 A | 5/2020 |
|----|-------------|--------|
| WO | 2019096214 A1 | 5/2019 |
| WO | 2019160353 A1 | 8/2019 |

OTHER PUBLICATIONS

International Search Report and Written Opinion mailed on Feb. 3, 2021 for International Application No. PCT/CN2020/126517, filed on Nov. 4, 2020 (9 pages).
Qualcomm Incorporated, "Fast SCell Activation and SCell Dormancy," 3GPP TSG-RAN WG1 #98bis, R1-1911139, Chongqing, China, Oct. 14-20, 2019, 19 pages.
CATT, "PDCCH skipping and switching of PDCCH monitoring periodicity," 3GPP TSG RAN WG1 Meeting #97, R1-1906353, Reno, USA, May 13-17, 2019, 6 pages.
Chinese Notification to Complete Formalities of Registration issued in CN Patent Application No. 202211360353.3, dated Jan. 23, 2024, 4 pages. English machine translation included.
Taiwanese office action issued in TW Patent Application No. 109138916, dated Jan. 29, 2024, 28 pages. English machine translation included.
Japanese Notice of Allowance issued in JP Patent Application No. 2022-526151, dated Aug. 31, 2023, 3 pages.
International Preliminary Report on Patentability issued in PCT/CN2020/126517, dated May 10, 2022, 6 pages.
Australian examination report issued in AU Patent Application No. 2020378123, dated Aug. 18, 2023, 8 pages.
Ericsson, "Summary #5 of efficient and low latency serving cell configuration/activation/setup," 3GPP TSG RAN WG1 Meeting #98bis, R1-1911653, Chongqing, China, Oct. 14-18, 2019, 20 pages.
Chinese office action issued in CN Patent Application No. 202211360353.3, dated Nov. 21, 2023, 6 pages. English machine translation included.
Chinese office action issued in CN Patent Application No. 202211360353.3, dated Aug. 16, 2023, 10 pages. English translation included.
European Search Report issued in EP Patent Application No. 20885282.2, dated Nov. 13, 2023, 10 pages.
Mediatek Inc., "NR UE Power Saving Designs," 3GPP TSG RAN WG1 Meeting #96, R1-1901804, Athens, Greece, Feb. 25-Mar. 1, 2019, 28 pages.
Vivo, "Fast Scell activation and dormancy like behavior," 3GPP TSG RAN WG1 #98bis, R1-1910242, Chongqing, China, Oct. 14-20, 2019, 11 pages.
Indian First Examination Report issued in corresponding IN Patent Application No. 202247026971, dated Dec. 1, 2022, 6 pages.
Japanese office action issued in JP Patent Application No. 2022-526151, dated Mar. 29, 2023, 5 pages. English translation included.
Ericsson, "Reduced latency Scell management for NR CA," 3GPP TSG-RAN WG1 #98bis, R1-1911015, Chongqing, China, Oct. 14-20, 2019, 10 pages.
CATT, "Offline Discussion Summary of PDCCH-based Power Saving Signal/Channel," 3GPP TSG RAN WG1 Meeting #98bis, R1-1911558, Chongqing, China, Oct. 14-20, 2019, 43 pages.
Qualcomm Incorporated, "Dormant BWP for fast SCell activation," 3GPP TSG-RAN WG2 Meeting #102, R2-1808570, Resubmission of R2-1805748, Busan, Korea, May 21-25, 2018, 3 pages.
Vivo, "Remaining aspects of PDCCH-based power saving signal," 3GPP TSG RAN WG1 #98bis, R1-1910233, Chongqing, China, Oct. 14-20, 2019, 15 pages.

* cited by examiner

SIGNALING PROCESSING METHOD AND APPARATUS, TERMINAL, AND STORAGE MEDIUM

CROSS-REFERENCE TO RELATED APPLICATIONS

This application is a continuation of International Patent Application No. PCT/CN2020/126517, filed on Nov. 4, 2020, which claims priority to Chinese Patent Application No. 201911090300.2 filed with the CNIPA on Nov. 8, 2019, the contents of each of which are incorporated herein by reference in their entirety.

TECHNICAL FIELD

The present application relates to digital communication transmission technologies, for example, a signaling processing method and apparatus, a terminal and a storage medium.

BACKGROUND

In the New Radio (NR) communication system of the 5th-Generation (5G) mobile communication technology, one or more bandwidth parts (BWP) may be configured on each serving cell. A secondary cell (SCell) has two states: an active state and an inactive state. In the case of self-scheduling, once the SCells are activated, a Physical downlink control channel monitoring (PDCCH monitoring) is simultaneously performed on a sub-carrier according to the relevant configuration on the SCells. In the case of no traffic transmission or sparse traffic, continuous intensive PDCCH monitoring on the SCell without data scheduling will generate unnecessary power consumption. In a protocol, generally, the activation/deactivation of the SCell is indicated by a control element (CE) of a media access control (MAC). The terminal does not perform operations such as PDCCH monitoring, channel measurement, and data reception on a deactivated SCell. Activation/deactivation of the SCell through the MAC CE will bring about a problem of large delay, and frequent activation/deactivation will similarly bring about unnecessary power consumption.

SUMMARY

To solve at least one above technical problem, embodiments of the present application provide schemes described below.

Embodiments of the present application provide a signaling processing method, and the method includes receiving, by a terminal, first signaling; and performing operation, by the terminal, on a bandwidth part (BWP) of a serving cell according to the first signaling.

Embodiments of the present application provide a signaling processing method, and the method includes receiving, by a terminal, second signaling; and adjusting, the terminal, a monitoring periodicity of a control channel according to the second signaling.

Embodiments of the present application provide a signaling processing apparatus, and the apparatus includes a receiving module and an operation module, where the receiving module is configured to receive first signaling, and the operation module is configured to perform the operation on a bandwidth part (BWP) of a serving cell according to the first signaling.

Embodiments of the present application provide a signaling processing apparatus, and the apparatus includes a receiving module and an adjustment module, where the receiving module is configured to receive second signaling, and the adjustment module is configured to adjust a monitoring periodicity of a control channel according to the second signaling.

Embodiments of the present application provide a terminal including a memory, a processor, and a computer program stored in the memory and executable by the processor, where the processor, when executing the computer program, performs any one of the signaling processing methods in embodiments of the present application.

Embodiments of the present application provide a terminal including a memory, a processor, and a computer program stored in the memory and executable by the processor, where the processor, when executing the computer program, performs any one of the signaling processing methods in embodiments of the present application.

Embodiments of the present application provide a computer-readable storage medium. The storage medium is configured to store a computer program. When the computer program is executed by a processor, any one of the signaling processing methods in embodiments of the present application is performed.

Embodiments of the present application provide a computer-readable storage medium. The storage medium is configured to store a computer program. When the computer program is executed by a processor, any one of the signaling processing methods in embodiments of the present application is performed.

The preceding embodiments and other aspects of the present application and implementations thereof are described in more detail in the brief description of drawings, detailed description, and claims.

DETAILED DESCRIPTION

Embodiments of the present application are described below in conjunction with drawings.

In addition, in the embodiments of the present application, words such as "optionally" or "exemplarily" are used for representing examples, illustrations, or descriptions. Any embodiment or design described as "optional" or "exemplary" in embodiments of the present disclosure should not be explained as being more preferred or advantageous than other embodiments or designs. Rather, the use of the words "optionally" or "exemplary" is intended to present related concepts in a specific manner.

Related concepts referred to in the embodiments of the present application are further explained herein.

Discontinuous receiving (DRX) refers to that a terminal does not continuously receive signaling, such as signals and/or channels, from a base station. One DRX cycle includes ON duration of a DRX cycle (DRX-ON) and OFF duration of a DRX cycle (DRX-OFF). In one DRX cycle, the time that the terminal remains awake is called active time, accordingly, the time other than the active time is called outside active time.

A serving cell includes a primary cell and a secondary cell. In this embodiment, the serving cell and a carrier can be interchanged, the secondary cell and a secondary carrier can be interchanged, and the primary cell and a primary carrier can be interchanged. That is, the secondary cell is in a corresponding relationship with the secondary carrier, the primary cell is in a corresponding relationship with the primary carrier, and the serving cell is in a corresponding relationship with the carrier.

Figure 1:
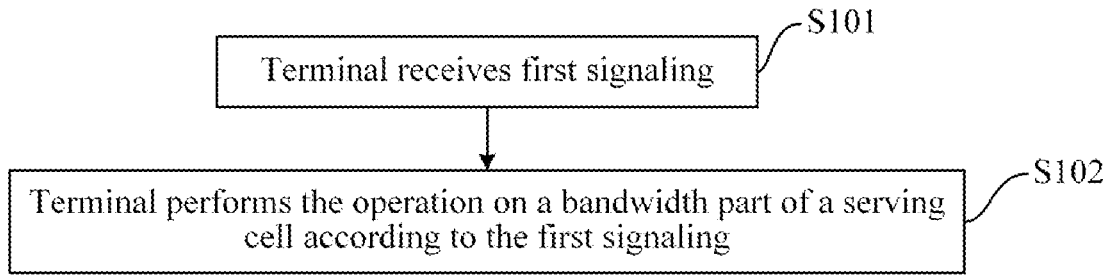
FIG. 1 is a flowchart of a signaling processing method according to an embodiment.

Based on the explanation of the above concepts, FIG. 1 is a flowchart of a signaling processing method according to an embodiment of the present application. As shown in FIG. 1, the method is applied to a terminal and includes the following.

In S101, the terminal receives first signaling.

In this embodiment, the first signaling is transmitted to the terminal through a base station, where the first signaling may be a signal or a channel.

In S102, the terminal performs the operation on a bandwidth part (BWP) of a serving cell according to the first signaling.

After the first signaling is received, the terminal may perform the operation on the BWP of the serving cell according to an indication of the first signaling.

Optionally, an operation in this embodiment may be: switching from a first power consumption behavior to a second power consumption behavior, or switching from a second power consumption behavior to a first power consumption behavior, or no behavior switching is performed.

Optionally, a switching manner between the first power consumption behavior and the second power consumption behavior may be a switching between a first power consumption BWP and a second power consumption BWP, and/or a switching between a first power consumption state of the BWP and a second power consumption state of the BWP.

Optionally, the switching manner between the first power consumption behavior and the second power consumption behavior is related to at least one or any combination of the following factors: (1) a DRX state or whether a DRX is configured; or (2) a length or a maximum length or a minimum length of a corresponding information field in the first signaling, or a length or a maximum length or a minimum length of downlink control information (DCI) carrying the first signaling; or (3) a radio network temporary identifier (RNTI) scrambling the first signaling; or (4) a DCI format carrying the first signaling; or (5) a search space; or (6) a frequency range; or (7) high-layer signaling; or (8) terminal capability.

Optionally, the switching manner between the first power consumption behavior and the second power consumption behavior is related to at least one of the DRX state or whether the DRX is configured. For example, in an outside active time of the DRX, the switching between the first power consumption behavior and the second power consumption behavior is achieved by using a switching between the first power consumption state of the BWP and the second power consumption state of the BWP. For example, in an outside active time of the DRX, the switching between the first power consumption behavior and the second power consumption behavior is achieved by using a switching between the first power consumption BWP and the second power consumption BWP.

Optionally, the switching manner between the first power consumption behavior and the second power consumption behavior is related to at least one of the length or the maximum length or the minimum length of the corresponding information field in the first signaling, or the length or the maximum length or the minimum length of the DCI carrying the first signaling. For example, the length of the corresponding information field in the first signaling or the length of the DCI carrying the first signaling is less than or equal to one threshold value, and the switching between the first power consumption behavior and the second power consumption behavior is achieved by using the switching between the first power consumption state of the BWP and the second power consumption state of the BWP. For example, the length of the corresponding information field in the first signaling or the length of the DCI carrying the first signaling is greater than the one threshold value, and the switching between the first power consumption behavior and the second power consumption behavior is achieved by using the switching between the first power consumption BWP and the second power consumption BWP.

Optionally, the switching manner between the first power consumption behavior and the second power consumption behavior is related to at least the RNTI scrambling the first signaling. For example, the RNTI is at least a power saving-radio network temporary identifier (PS-RNTI), and the switching between the first power consumption behavior and the second power consumption behavior is achieved by using the switching between the first power consumption state of the BWP and the second power consumption state of the BWP. For example, the RNTI is at least a cell-radio network temporary identifier (C-RNTI), and the switching between the first power consumption behavior and the second power consumption behavior is achieved by using the switching between the first power consumption BWP and the second power consumption BWP.

Optionally, the switching manner between the first power consumption behavior and the second power consumption behavior is related to at least the DCI format carrying the first signaling.

For example, the DCI format is at least one of a DCI format 0_1 or a DCI format 1_1, and the switching between the first power consumption behavior and the second power consumption behavior is achieved by using the switching between the first power consumption BWP and the second power consumption BWP. For example, the DCI format does not include the DCI format 0_1 and the DCI format 1_1, and the switching between the first power consumption behavior and the second power consumption behavior is achieved by using the switching between the first power consumption state of the BWP and the second power consumption state of the BWP.

Optionally, the switching manner between the first power consumption behavior and the second power consumption behavior is related to at least the search space. For example, the search space is a user equipment-specific (UE-specific) search space, and the switching between the first power consumption behavior and the second power consumption behavior is achieved by using the switching between the first power consumption BWP and the second power consumption BWP. For example, the search space is a common search space, and the switching between the first power consumption behavior and the second power consumption behavior is achieved by using a switching between the first power consumption state of the BWP and the second power consumption state of the BWP.

Optionally, the switching manner between the first power consumption behavior and the second power consumption behavior is related to at least the high-layer signaling.

Optionally, the switching manner between the first power consumption behavior and the second power consumption behavior is related to at least the frequency range. The frequency range includes at least one of a frequency range 1 or a frequency range 2.

Optionally, the switching manner between the first power consumption behavior and the second power consumption behavior is related to at least the terminal capability.

Optionally, the switching manner between the first power consumption behavior and the second power consumption behavior is related to at least one of the DRX state or whether the DRX is configured, the length the a maximum length or the minimum length of the corresponding information field in the first signaling, or the length or the maximum length or the minimum length of the DCI carrying the first signaling. Optionally, the switching manner between the first power consumption behavior and the second power consumption behavior is related to at least one of the DRX state or whether the DRX is configured, the RNTI scrambling the first signaling or the DCI format carrying the first signaling. Optionally, the switching manner between the first power consumption behavior and the second power consumption behavior is related to at least one of the RNTI scrambling the first signaling or the DCI format carrying the first signaling. Optionally, the switching manner between the first power consumption behavior and the second power consumption behavior is related to at least one of the RNTI scrambling the first signaling, the DCI format carrying the first signaling or the search space. Optionally, the switching manner between the first power consumption behavior and the second power consumption behavior is related to at least one of the DRX state or whether the DRX is configured, the RNTI scrambling the first signaling, the DCI format carrying the first signaling or the search space.

Exemplarily, in this embodiment, the first power consumption behavior may be understood as a dormancy behavior, and the second power consumption behavior may be understood as a non-dormancy behavior. Alternatively, the first power consumption behavior may be understood as a non-dormancy behavior and the second power consumption behavior may be understood as a dormancy behavior.

In the embodiment of the present application, after the first signaling is received, the terminal can learn the specific operation based on the first signaling, and then can quickly perform the corresponding operation on the BWP of the serving cell according to the first signaling, thereby reducing the power consumption of the terminal and reducing the service delay.

In one example, the terminal performs the operation on the BWP of the serving cell according to the first signaling, and may performs the operation on the BWP of the serving cell by the BWP switching For example, the operation includes: switching from the first power consumption BWP to the second power consumption BWP, or switching from the second power consumption BWP to the first power consumption BWP, or no operation is performed. In this embodiment, the first power consumption BWP may be understood as a dormant BWP, and the second power consumption BWP may be understood as a non-dormant BWP. Alternatively, the first power consumption BWP may be understood as a non-dormant BWP and the second power consumption behavior may be understood as a dormant BWP.

The base station configures two or more BWPs for the serving cell of the terminal, and configures the dormant BWP and the non-dormant BWP.

Optionally, the serving cell may be a secondary cell.

Optionally, the dormant BWP has the following characteristics: no monitoring of a control channel is configured or sparse monitoring periodicity of a control channel is configured, but channel state information (CSI) measurement resource or a CSI report or a sounding reference signal (SRS) resource is configured.

Optionally the control channel may be a physical downlink control channel (PDCCH).

Optionally, sparse monitoring of the control channel may be a monitoring of the control channel with a larger monitoring periodicity. For example, once monitoring is performed in each 1280 slots.

Optionally, the monitoring periodicity of the control channel configured by the dormant BWP is sparser than the monitoring periodicity of the control channel configured by the non-dormant BWP.

When M in the first signaling is 0, in S102, the terminal may perform the operation on the BWP of the secondary cell according to the first signaling in the following optional operation manners: optionally, after the first signaling is received, the terminal switches to the dormant BWP according to a predefined indication; optionally, after the first signaling is received, the terminal switches to the non-dormant BWP according to a predefined indication. The above predefined indication may be a default configuration or is configured by a high-layer.

When M in the first signaling is 1, a target operation indicated by the 1 bit is the first power consumption behavior of the terminal or the second power consumption behavior of the terminal. For example, the BWP is switched to the first power consumption BWP to achieve the first power consumption behavior of the terminal, or the BWP is switched to the second power consumption BWP to achieve the second power consumption behavior of the terminal.

Optionally, the 1-bit value is 1, which may be used for indicating the terminal to switch to the first power consumption BWP, and the 1-bit value is 0, which may be used for indicating the terminal to switch to the second power consumption BWP. Optionally, the 1-bit value is 1, which may be used for indicating the terminal to switch to the second power consumption BWP, and the 1-bit value is 0, which may be used for indicating the terminal to switch to the first power consumption BWP. Optionally, the 1-bit value is 1, which may be used for indicating the terminal to maintain the existing state and do not perform the BWP switching, and the 1-bit value is 0, which may be used for indicating the terminal to switch to a BWP having an opposite behavior, such as, to switch from the first power consumption BWP to the second power consumption BWP, or to switch from the second power consumption BWP to the first power consumption BWP. Optionally, the 1-bit value is 1, which may be used for indicating the terminal to switch to the BWP having the opposite behavior, such as to switch from the first power consumption BWP to the second power consumption BWP, or to switch from the second power consumption BWP to the first power consumption BWP, and the 1-bit value is 0, which may be used for indicating the terminal to maintain the existing behavior and do not perform the BWP switching.

When the terminal receives the first signaling and does not need to perform the BWP switching, optionally, the terminal restarts an inactivation timer of the BWP (bwp-InactivityTimer); optionally, the terminal does not perform any operation.

When the terminal receives the first signaling and the first signaling indicates the terminal to switch to the first power consumption BWP, optionally, if the terminal is configured with only one first power consumption BWP, the terminal switches to the first power consumption BWP; optionally, if the terminal is configured with a plurality of first power consumption BWPs, the terminal switches to the first power consumption BWP with the largest BWP identity in default; and optionally, if the terminal is configured with a plurality of first power consumption BWPs, the terminal switches to a predefined first power consumption BWP configured by the high-layer.

When the terminal receives the first signaling and the first signaling indicates the terminal to switch to the second power consumption BWP, optionally, if the terminal is configured with only one second power consumption BWP, the terminal switches to the second power consumption BWP; optionally, if the terminal is configured with a plurality of second power consumption BWPs, the terminal switches to a predefined second power consumption BWP configured by the higher layer; optionally, if the terminal is configured with a plurality of second power consumption BWPs, the terminal switches to the second power consumption BWP with the smallest BWP identity; optionally, if the terminal is configured with a plurality of second power consumption BWPs, the terminal switches to the second power consumption BWP with the largest BWP identity; optionally, if the terminal is configured with a plurality of second power consumption BWPs, the terminal switches to the second power consumption BWP corresponding to a next BWP identity in a cyclic manner, for example, if the current BWP identity is 1, the terminal switches to the second power consumption BWP with the BWP identity of 2, and if the current BWP identity is 2, the terminal switches to the second power consumption BWP with the BWP identity of 3; optionally, if the terminal is configured with a plurality of second power consumption BWPs, the terminal switches to the second power consumption BWP where data was received or transmitted last time; optionally, if the terminal is configured with a plurality of second power consumption BWPs, the terminal switches to the second power consumption BWP configured with the largest bandwidth; optionally, if the terminal is configured with a plurality of second power consumption BWPs, the terminal switches to the second power consumption BWP configured with the maximum number of multiple-input multiple-output (MIMO) layers; optionally, if the terminal is configured with a plurality of second power consumption BWPs, the terminal switches to the second power consumption BWP with the minimum PDCCH monitoring periodicity.

Optionally, the base station configures one or more associated BWP groups; Optionally, the associated BWP groups include at least one first power consumption BWP and at least one second power consumption BWP; optionally, the first power consumption BWP and the second power consumption BWP have a same characteristic; optionally, the same characteristic includes at least one of the following: a same bandwidth, a same center carrier frequency, a same sub-carrier spacing, a same occupied frequency domain resource, or the same number of antennas, etc.; optionally, the first power consumption BWP and the second power consumption BWP have different PDCCH monitoring parameters; optionally, the first power consumption BWP and the second power consumption BWP have the same BWP identity; optionally, the first power consumption BWP and the second power consumption BWP have two independent BWP identities; optionally, when the first signaling transmitted by the base station indicates that the terminal switches to the first power consumption behavior, the terminal switches to the associated first power consumption BWP; optionally, when the first signaling transmitted by the base station indicates that the terminal switches to the second power consumption behavior, the terminal switches to the associated second power consumption BWP.

When M in the first signaling is 2, the 2 bits indicate a target BWP identity of the terminal, that is, the BWP switching is directly performed according to the target BWP identity; optionally, if a BWP corresponding to the target BWP identity indicated by the 2 bits is the first power consumption BWP, the terminal switches to the first power consumption behavior, that is, the target operation is the first power consumption behavior; optionally, if a BWP corresponding to the target BWP identity indicated by the 2 bits is the second power consumption BWP, the terminal switches to the second power consumption behavior, that is, the target operation is the second power consumption behavior.

If the target BWP identity indicated by the first signaling is the same as a currently activated BWP identity, optionally, the terminal restarts the inactivation timer; optionally, the terminal stops counting the inactive timer; optionally, the terminal ignores this indication of the first signaling and does not perform any operation. If the target BWP identity indicated by the first signaling is different from the currently activated BWP identity, and the target BWP identity indicated by the first signaling does not exceed a BWP configuration of the terminal, the terminal switches from the currently activated BWP to a BWP corresponding to the target BWP identity indicated by the first signaling; optionally, if the target BWP identity indicated by the first signaling is different from the currently activated BWP identity, and the target BWP identity indicated by the first signaling exceeds the BWP configuration of the terminal, it is considered that the indication of the first signaling is wrong and the terminal does not perform any operation.

In one example, the terminal performs the operation on the BWP of the serving cell according to the first signaling, and may perform the operation on a BWP state of the serving cell. For example, switching to the first power consumption behavior or the second power consumption behavior is achieved through the switching between the first power consumption state of the BWP and the second power consumption state of the BWP. Optionally, the serving cell may be a secondary cell, the first power consumption state may be understood as a BWP dormant state, and the second power consumption state may be understood as a BWP active state, or the first power consumption state may be understood as a BWP active state, and the second power consumption state may be understood as a BWP dormant state.

The base station configures the first power consumption state for part or all of the BWP of the terminal, and the first power consumption state is a special state other than the second power consumption state and a third power consumption state. Optionally, the third power consumption state may be understood as an inactive state.

Optionally, when the BWP is in the first power consumption state, the BWP has the following characteristics: no monitoring of a control channel is configured or sparse monitoring periodicity of a control channel is configured, but a CSI measurement resource or a CSI report or an SRS resource is configured.

Optionally, the above control channel may be a physical downlink control channel.

Optionally, sparse monitoring of the control channel may be a monitoring of the control channel with a larger monitoring periodicity. For example, once monitoring is performed in each 1280 slots.

Optionally, the monitoring periodicity of the control channel configured by the above BWP in the first power consumption state is sparser than the monitoring periodicity of the control channel configured by the BWP in the second power consumption state.

Optionally, the target operation indicated by the M bits included in the first signaling received by the terminal in S101 may be achieved through the switching between the first power consumption state of the BWP and the second power consumption state of the BWP. For example, the first power consumption behavior of the terminal indicated by the M bits may be achieved by switching to the first power consumption state of the BWP, or the second power consumption behavior of the terminal indicated by the M bits may be achieved by switching to the second power consumption state of the BWP.

When M in the first signaling is 0, in S102, the terminal may perform the operation on the BWP of the secondary cell according to the first signaling in the following optional operation manners: optionally, after the first signaling is received, the terminal switches to the first power consumption state of the BWP according to a predefined indication; optionally, after the first signaling is received, the terminal switches to the second power consumption state of the BWP according to a predefined indication. The above predefined indication may be a default configuration or is configured by a high-layer.

When M is 1, in the above S102, the terminal may perform the operation on the BWP of the serving cell according to the first signaling in the following optional operation manners: optionally, the 1-bit value is 1, which may be used for indicating the terminal to switch to the first power consumption state of the BWP, and the 1-bit value is 0, which may be used for indicating the terminal to switch to the second power consumption state of the BWP; optionally, the 1-bit value is 1, which may be used for indicating the terminal to switch to the second power state of the BWP, and the 1-bit value is 0, which may be used for indicating the terminal to switch to the first power state of the BWP; optionally, the 1-bit value is 1, which may be used for indicating the terminal to maintain the current state and do not switch a state of the BWP, and the 1-bit value is 0, which may be used for indicating the terminal to switch the current state, such as from the second power consumption state of the current BWP to the first power consumption state of the BWP, or from the first power consumption state of the current BWP to the second power consumption state of the BWP; optionally, the 1-bit value is 1, which may be used for indicating the terminal to switch the current state, such as from the second power consumption state of the BWP to the first power consumption state of the BWP, or from the first power consumption state of the BWP to the second power consumption state of the BWP; and the 1-bit value is 0, which be used for indicating the terminal to maintain the current state and do not switch a state of the BWP.

When the terminal needs to switch to the first power consumption state of the BWP according to the indication of the first signaling, optionally, if the terminal detects that the BWP receiving the first signaling is configured with the first power consumption state, the terminal switches to the first power consumption state of the BWP; optionally, if the terminal detects that the BWP receiving the first signaling is not configured with the first power consumption state, the terminal does not perform a switching operation of the state of the BWP; optionally, if the terminal detects that the BWP receiving the first signaling is not configured with the first power consumption state, the terminal switches to the first power consumption state of the BWP satisfying a configuration requirement. When there are a plurality of BWPs satisfying the configuration requirement, optionally, the terminal switches to a predefined BWP configured by the higher-layer; optionally, the terminal switches to the BWP with the largest BWP identity in default; optionally, the terminal switches to the BWP with the smallest BWP identity in default.

When M is 2, in the above S102, the terminal may perform the operation on the BWP of the serving cell according to the first signaling in the following optional operation manners: optionally, one of the two bits is used for indicating a target state, such as the first power consumption state or the second power consumption state, for example, the 1-bit value is 1 to represent the second power consumption state, and the 1-bit value is 0 to represent the first power consumption state, or the 1-bit value is 1 to represent the first power consumption state, and the 1-bit value is 0 to represent the second power consumption state; and the other one of the two bits is used for indicating whether the terminal switches the BWP, for example, the 1-bit value is 1 to represent switching to another BWP, and the 1-bit value is 0 to represent no switching is performed on the BWP, or the 1-bit value is 0 to represent switching to another BWP, and the 1-bit value is 1 to represent no switching is performed on the BWP.

When The first signaling is used for indicating to switch the BWP, and there are a plurality of BWPs available for switching, optionally, the terminal may switch to a predefined BWP configured by the higher-layer; optionally, the terminal may switch to the BWP with the largest BWP identity; optionally, the terminal may switch to the BWP with the smallest BWP identity.

Optionally, when the BWP switched to the first power consumption state satisfies a predefined condition, the first signaling indicates the terminal to switch the state of the BWP and trigger the measurement or report of the BWP at the same time.

The above predefined condition may be a CSI measurement/report or SRS resource for which a periodicity is not configured, or an inactive semi-persistent CSI measurement/report or SRS resource, or the periodicity of a CSI measurement/report or SRS resource having a specific characteristic.

In one example, in a case where the terminal is configured with the first power consumption BWP and the first power consumption state of the BWP at the same time, when the terminal perform the operation on the BWP of the serving cell according to the first signaling, if the terminal may be switched to the target operation according to the first signaling without switching the BWP, a switching method based on the state of the BWP may be preferentially used, thereby reducing the power consumption of the time delay generated by switching the BWP.

The base station configures two or more BWPs for the terminal, and configures the first power consumption BWP and the second power consumption BWP for the terminal. Optionally, the first power consumption BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above first power consumption BWP is sparser than the monitoring periodicity of the control channel configured by the second power consumption B WP.

Optionally, the above control channel may be a physical downlink control channel.

The base station may configure the first power consumption state for one or more BWPs of the terminal, and the first power consumption state is a special state other than the second power consumption state and a third power consumption state. Optionally, when the BWP is in the first power consumption state, the BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above BWP in the first power consumption state is sparser than the monitoring periodicity of the control channel configured by the BWP in the second power consumption state.

Optionally, sparse monitoring of the control channel may be a monitoring of the control channel with a larger monitoring periodicity. For example, once monitoring is performed in each 1280 slots.

Optionally, the target operation indicated by the M bits included in the first signaling received by the terminal in S101 may be achieved through the switching between the first power consumption state of the BWP and the second power consumption state of the BWP or the switching between the first power consumption BWP and the second power consumption BWP. For example, the first power consumption behavior of the terminal indicated by the M bits may be achieved by switching to the first power consumption state of the BWP, or the second power consumption behavior of the terminal indicated by the M bits may be achieved by switching to the second power consumption state of the BWP, or the first power consumption behavior of the terminal indicated by the M bits may be achieved by switching to the first power consumption BWP, or the second power consumption behavior of the terminal indicated by the M bits may be achieved by switching to the second power consumption BWP. Optionally, a UE selects to switch the BWP or switch the state of the BWP according to THE predetermined condition. Optionally, the predefined condition is configured by the high-layer. Optionally, the predefined condition is time for receiving the PDCCH. Optionally, a switching manner of the state of the BWP is used outside active time. Optionally, a switching manner of the BWP is used within active time.

When M in the first signaling is 0, S102 in this embodiment may have the following optional implementation manners: optionally, after the first signaling is received, the terminal switches to the first power consumption behavior according to the predefined indication; optionally, after the first signaling is received, the terminal switches to the second power consumption behavior according to the predefined indication. The above predefined indication may be a default configuration or is configured by a high-layer.

When M is 1, S102 may have the following optional implementation manner optionally, the 1-bit value is 1, which may be used for indicating the terminal to switch to the first power consumption behavior; optionally, the 1-bit value is 0, which may be used for indicating the terminal to switch to the second power consumption behavior; optionally, the 1-bit value is 1, which may be used for indicating the terminal to switch to the second power consumption behavior; optionally, the 1-bit value is 0, which may be used for indicating the terminal to switch to the first power consumption behavior; optionally, the 1-bit value is 1, which may be used for indicating the terminal to maintain the existing behavior and do not perform switching; optionally, the 1-bit value is 0, which may be used for indicating the terminal to switch to the opposite behavior, such as from the first power consumption behavior to the second power consumption behavior, or from the second power consumption behavior to the first power consumption behavior; optionally, the 1-bit value is 1, which may be used for indicating the terminal to switch to the opposite behavior, such as from the first power consumption behavior to the second power consumption behavior, or from the second power consumption behavior to the first power consumption behavior; optionally, the 1-bit value is 0, which may be used for indicating the terminal to maintain the existing behavior and do not perform switching.

When the terminal needs to switch to the first power consumption behavior according to the indication of the first signaling, optionally, the terminal may be achieved by using the method for switching the state of the BWP preferentially, that is, if the terminal detects that the BWP receiving the first signaling is configured with the first power consumption state, the terminal directly switches to the first power consumption state of the BWP; optionally, if the terminal detects that the BWP receiving the first signaling is not configured with the first power consumption state, the terminal switches to the first power consumption BWP by using a manner of switching the BWP. When there are a plurality of BWPs satisfying the configuration requirement, optionally, the terminal switches to a predefined BWP configured by the higher-layer; optionally, the terminal switches to the BWP with the largest BWP identity in default; optionally, the terminal switches to the BWP with the smallest BWP identity in default.

When the terminal needs to switch to the second power consumption behavior according to the indication of the first signaling, optionally, if the terminal detects that the BWP receiving the first signaling is in the first power consumption state of the BWP, the terminal directly switches to the second power consumption state of the BWP; optionally, if the terminal detects that the BWP receiving the first signaling is the first power consumption BWP, the terminal switches to the second power consumption BWP. When there are a plurality of second power consumption BWPs, optionally, the terminal switches to a predefined BWP configured by the higher-layer; optionally, the terminal may switch to the default BWP, optionally, the terminal switches to the BWP with the largest BWP identity in default; optionally, the terminal switches to the BWP with the smallest BWP identity in default.

When there are 2 bits in the first signaling, that is, M is 2, optionally, the 2 bits may be used for indicating a target BWP identity of the terminal; optionally, the 2 bits may be used for indicating that a BWP corresponding to the target BWP identity is the first power consumption BWP, then the terminal switches to the first power consumption behavior according to the first signaling; optionally, if a BWP corresponding to the target BWP identity indicated by the 2 bits is the second power consumption BWP, the terminal switches to the second power consumption behavior according to the first signaling.

Optionally, one of the two bits may be used for indicating a target operation, such as the first power consumption behavior or the second power consumption behavior. For example, the 1-bit value is 1, which may be used for indicating the first power consumption behavior, and the 1-bit value is 0, which may be used for indicating the second power consumption behavior; or the 1-bit value is 1, which may be used for indicating the second power consumption behavior, and the 1-bit value is 0, which may be used for indicating the first power consumption behavior. The other one of the two bits is used for indicating an implementation method. For example, the 1-bit value is 1, which may be used for representing that the target operation is performed by switching the BWP, and the 1-bit value is 0, which may be used for representing that the target operation is performed by switching the BWP; or the 1-bit value is 1, which may be used for representing that the target operation is performed by switching the BWP, and the 1-bit value is 0, which may be used for indicating that the target operation is performed by switching the BWP.

For example, the base station configures three BWPs for the terminal, assuming that three BWPs are respectively a BWP1, a BWP2 and a BWP3, the BWP1 is the second power consumption BWP and is not configured with the first power consumption state, the BWP2 is the second power consumption BWP and is configured with the first power consumption state, and the BWP3 is the first power consumption BWP. Then at a moment 1, the activated BWP is the BWP2 and is in the second power consumption state, at this time, the first signaling is received, and the first signaling may be one specific DCI. One bit in the one specific DCI indicates the terminal to switch to the first power consumption behavior, and the terminal switches to the first power consumption state of the BWP2 by switching the state of the BWP. At a moment 2, the activated BWP is the BWP3, and the terminal receives specific DCI for indicating the terminal to switch to the second power consumption behavior. Since the BWP3 is the first power consumption BWP, the second power consumption behavior may be achieved by switching the BWP. Optionally, the terminal may switch to the BWP1 or the BWP2 according to the predefined information or high-layer configuration information.

In another example, S101 is that the terminal receives the first signaling in outside active time, where the outside active time may be discontinuous outside active time.

Optionally, the terminal receives the PDCCH from the base station during the outside active time, the PDCCH includes DCI indicating the terminal to operate, and the DCI includes some information elements or information fields indicating the terminal to operate. Optionally, the PDCCH may be a PDCCH carrying a wake up signal, such as a PDCCH wake up signal (WUS), or a PDCCH in which a cyclic redundancy check (CRC) is scrambled by the PS-RNTI, or a DCI Format 3_0.

After the PDCCH receives during the outside active time, the terminal may achieve the following operation for the BWP of the serving cell. Optionally, the operation manner may be to switch the first power consumption BWP of the serving cell to the second power consumption BWP of the serving cell, or to switch the second power consumption BWP of the serving cell to the first power consumption BWP of the serving cell, or not to switch the BWP. Optionally, the second power consumption BWP refers to a normal BWP or a specific BWP. Optionally, the operation manner may be to switch one BWP of the serving cell from the first power consumption state to the second power consumption state, or to switch one BWP of the serving cell from the second power consumption state to the first power consumption state, or not to perform switching; optionally, the BWP in the second power consumption state means that the BWP is in a normal state or a specific state. Optionally, the serving cell may be a secondary cell.

Optionally, a UE selects to switch the BWP or switch the state of the BWP according to THE predetermined condition. Optionally, the predefined condition is configured by the high-layer. Optionally, the predefined condition is time for receiving the PDCCH. Optionally, a switching manner of the state of the BWP is used outside active time. Optionally, a switching manner of the BWP is used within active time.

Optionally, the PDCCH WUS may include the first signaling indicating the first power consumption behavior of a terminal serving cell; optionally, a length of the first signaling may be configured by the high-layer; optionally, the length of the first signaling may be 0 to 15 bits.

After the first signaling is received during the outside active time, the terminal may perform the operation on the BWP of the serving cell or a BWP of a serving cell group according to an indication of N bits in the first signaling. Optionally, the serving cell may be a secondary cell.

Each of the N bits corresponds to a target operation of a BWP of one secondary cell; or each of the N bits corresponds to a target operation of a BWP of one secondary cell group; or a first part of bits in the N bits corresponds to a target operation of a BWP of one secondary cell group, and a second part of bits in the N bits corresponds to a target operation of a BWP of one secondary cell, where the N bits includes at least one first part of bits and at least one second part of bits. The first part of bits may be understood as a bit corresponding to the target operation of the BWP of one secondary cell group, and the second part of bits may be understood as a bit corresponding to the target operation of the BWP of one secondary cell. For example, assuming that there are four bits, and the four bits from left to right correspond to the secondary cell, the secondary cell group, the target operation of the secondary cell and the target operation of the secondary cell group, respectively, the second and fourth bits may be understood as the first part of bits, and the first and third bits may be understood as the second part of bits.

Similarly, the above target operation includes: switching from a first power consumption behavior to a second power consumption behavior, or switching from a second power consumption behavior to a first power consumption behavior, or no behavior switching is performed.

For example, one secondary cell corresponds to one bit; optionally, a bit corresponding to the secondary cell always exists regardless of whether it is activated or not; optionally, the terminal ignores bits corresponding to inactive cells; optionally, if the secondary cell is in an active state, the bit corresponding to the secondary cell exists; and optionally, if the secondary cell is in an inactive state, the bit does not exist. Optionally, one secondary cell group corresponds to one bit; optionally, an operation of the BWP of each secondary cell within the secondary cell group is the same. For example, if the base station configures fifteen secondary cells to the terminal, the fifteen secondary cells are divided into five secondary cell groups, each secondary cell group includes three secondary cells within each secondary cell group, then each secondary cell group corresponds to one bit, that is, there are five bits in total.

Optionally, if the value of one bit is 0, a user equipment switches an active BWP of the secondary cell corresponding to the one bit from the first power consumption state to the second power consumption state. If the value of one bit is 1, a user equipment switches an active BWP of the secondary cell corresponding to the one bit from the second power consumption state to the first power consumption state. Optionally, if a BWP of one secondary cell is already in a state corresponding to the target operation indicated by the base station, the terminal maintains the current state unchanged.

For example, if the base station configures five secondary cells to the terminal, there are five bits in the WUS to indicate the operations on the BWPs of the five secondary cells. If the five bits are "00011" and correspond to the first to fifth secondary cells from left to right, the terminal switches the currently active BWP of first three secondary cells to the second power consumption state. If the current BWPs of the first three secondary cells are already in the second power consumption state, the terminal maintains the current state unchanged. Similarly, the terminal switches the current active BWPs of a fourth and fifth secondary cells to the first power consumption state, and if the fourth and fifth secondary cells are already in the first power consumption state, the terminal maintains the current state unchanged.

Optionally, the above bits may have two states, for example, a bit value of 1 is a state 1, and a bit value of 0 is a state 2; or a bit value of 0 is a state 1, and a bit value of 1 is a state 2.

Optionally, if the value of one bit is 1, the terminal switches the active BWP of the secondary cell corresponding to the one bit from the first power consumption state to the second power consumption state; and if the value of one bit is 0, the terminal switches the active BWP of the secondary cell corresponding to the one bit from the second power consumption state to the first power consumption state.

Optionally, if the value of one bit is 0, the terminal maintains a state of the active BWP of the secondary cell corresponding to the one bit unchanged; and if the value of one bit is 1, the terminal reverses a state of the active BWP of the secondary cell corresponding to the one bit. For example, the first power consumption state where the currently active BWP is located is switched to the second power consumption state. Optionally, if the value of one bit is 1, the terminal maintains a state of the active BWP of the secondary cell corresponding to the one bit unchanged; and if the value of one bit is 0, the terminal reverses a state of the active BWP of the secondary cell corresponding to the one bit.

Optionally, if the value of one bit is 0, the terminal switches the active BWP of the secondary cell corresponding to the one bit to the first power consumption BWP, and if the current active BWP is the first power consumption BWP, no operation is performed.

Optionally, if the value of one bit is C1, the user equipment switches the BWP of the secondary cell or the secondary cell group corresponding to the one bit from the first power consumption BWP to the second power consumption BWP; if the value of one bit is C2, the user equipment switches the BWP of the secondary cell corresponding to the one bit from the second power consumption BWP to the first power consumption BWP. Optionally, if the BWP of one secondary cell is already the BWP corresponding to the target operation indicated by the base station, the terminal maintains the current BWP unchanged.

Optionally, if the value of one bit is C1, the terminal maintains the BWP of the secondary cell corresponding to the one bit unchanged; and if the value of one bit is C2, the terminal switches the BWP of the secondary cell corresponding to the one bit. For example, the first power consumption BWP where the current BWP is located is switched to the second power consumption BWP. For example, the second power consumption BWP where the current BWP is located is switched to the first power consumption BWP.

C1 is 0 or 1, and C2 is 1 or 0.

Optionally, the first power consumption state of the BWP and/or the second power consumption state of the BWP may be configured by the base station or indicated or predefined by the base station.

Optionally, the first power consumption BWP and/or the second power consumption BWP may be configured by the base station or indicated or predefined by the base station.

Optionally, if one secondary cell includes a plurality of first power consumption BWP, the terminal selects a first power consumption BWP with the smallest BWP identity, or selects the most recently used BWP; and optionally, if one secondary cell does not include the first power consumption BWP, no operation is performed by the terminal.

Optionally, if one secondary cell includes a plurality of second power consumption BWP, the terminal selects a second power consumption BWP with the largest BWP identity; and optionally, if one secondary cell does not include the second power consumption BWP, no operation is performed by the terminal.

Optionally, if the terminal is configured with one second power consumption BWP, the terminal switches to the second power consumption BWP; optionally, if the terminal is configured with a plurality of second power consumption BWPs, the terminal switches to a predefined second power consumption BWP; optionally, if the terminal is configured with a plurality of second power consumption BWPs, the terminal switches to the second power consumption BWP with the smallest BWP identity; optionally, if the terminal is configured with a plurality of second power consumption BWPs, the terminal switches to the second power consumption BWP with the largest BWP identity; optionally, if the terminal is configured with a plurality of second power consumption BWPs, the terminal switches to the second power consumption BWP corresponding to a next BWP identity in a cyclic manner, for example, if the current BWP identity is 1, the terminal switches to the second power consumption BWP with the BWP identity of 2, and if the current BWP identity is 2, the terminal switches to the second power consumption BWP with the BWP identity of 3; optionally, if the terminal is configured with a plurality of second power consumption BWPs, the terminal switches to the second power consumption BWP where data was received or transmitted last time; optionally, if the terminal is configured with a plurality of second power consumption BWPs, the terminal switches to the second power consumption BWP configured with the largest bandwidth; optionally, if the terminal is configured with a plurality of second power consumption BWPs, the terminal switches to the second power consumption BWP configured with the maximum number of MIMO layers; and optionally, if the terminal is configured with a plurality of second power consumption BWPs, the terminal switches to the second power consumption BWP with the minimum PDCCH monitoring periodicity.

Optionally, if the terminal is configured with one first power consumption BWP, the terminal switches to the first power consumption BWP; optionally, if the terminal is configured with a plurality of first power consumption BWPs, the terminal switches to a predefined first power consumption BWP; optionally, if the terminal is configured with a plurality of first power consumption BWPs, the terminal switches to the first power consumption BWP with the smallest BWP identity; optionally, if the terminal is configured with a plurality of first power consumption BWPs, the terminal switches to the first power consumption BWP with the largest BWP identity; optionally, if the terminal is configured with a plurality of first power consumption BWPs, the terminal switches to the first power consumption BWP corresponding to a next BWP identity in a cyclic manner, for example, if the current BWP identity is 1, the terminal switches to the first power consumption BWP with the BWP identity of 2, and if the current BWP identity is 2, the terminal switches to the first power consumption BWP with the BWP identity of 3; optionally, if the terminal is configured with a plurality of first power consumption BWPs, the terminal switches to the first power consumption BWP configured with the smallest bandwidth; optionally, if the terminal is configured with a plurality of first power consumption BWPs, the terminal switches to the first power consumption BWP configured with the minimum number of MIMO layers; and optionally, if the terminal is configured with a plurality of first power consumption BWPs, the terminal switches to the first power consumption BWP with the maximum PDCCH monitoring periodicity.

Optionally, the base station configures one or more associated BWP groups; Optionally, the associated BWP groups include at least one first power consumption BWP and at least one second power consumption BWP; optionally, the first power consumption BWP and the second power consumption BWP have a same characteristic; optionally, the same characteristic includes at least one of the following: a same bandwidth, a same center carrier frequency, a same sub-carrier spacing, a same occupied frequency domain resource, or the same number of antennas, etc.; optionally, the first power consumption BWP and the second power consumption BWP have different PDCCH monitoring parameters; optionally, the first power consumption BWP and the second power consumption BWP have the same BWP identity; optionally, the first power consumption BWP and the second power consumption BWP have two independent BWP identities; optionally, when the first signaling transmitted by the base station indicates that the terminal switches to the first power consumption behavior, the terminal switches to the associated first power consumption BWP; and optionally, when the first signaling transmitted by the base station indicates that the terminal switches to the second power consumption behavior, the terminal switches to the associated second power consumption BWP.

Optionally, when the BWP switched to the first power consumption state satisfies a predefined condition, the first signaling indicates the terminal to switch the state of the BWP and trigger the measurement or report of the BWP at the same time.

The above predefined condition may be a CSI measurement/report or SRS resource for which a periodicity is not configured, or an inactive semi-persistent CSI measurement/report or SRS resource, or the periodicity of a CSI measurement/report or SRS resource has a specific characteristic.

In the above manner, the terminal can learn which BWP of the secondary cell needs to do what operation according to the first signaling, and quickly perform corresponding operation on the BWP of the secondary cell according to the indication of the first signaling, thereby saving the power consumption of the terminal and reducing the service delay.

In another example, the base station configures a DRX related parameter for the terminal and configures a plurality of cells for the terminal.

Optionally, the base station may configure the first power consumption BWP and the second power consumption BWP for the terminal. Optionally, the first power consumption BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above first power consumption BWP is sparser than the monitoring periodicity of the control channel configured by the second power consumption BWP.

Optionally, the base station may configure the first power consumption state for part or all of BWPs of the terminal, where the first power consumption state is a special state other than the second power consumption state and a third power consumption state. Optionally, when the BWP is in the first power consumption state, the BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above BWP in the first power consumption state is sparser than the monitoring periodicity of the control channel configured by the BWP in the second power consumption state.

Optionally, sparse monitoring of the control channel may be a monitoring of the control channel with a larger monitoring periodicity. For example, once monitoring is performed in each 1280 slots.

Optionally, in S101, the first signaling may be first signaling transmitted by the base station to the primary cell and the primary-secondary cell of the terminal. For example, the base station may transmit the first signaling to the primary cell of the terminal in a carrier aggregation (CA) scene, and the base station may transmit the first signaling to the primary cell and the primary-secondary cell of the terminal in a dual-connectivity (DC) scene.

Optionally, N bits in the first signaling may correspond to target operations of BWPs of N secondary cells; or N bits may correspond to target operations of BWPs of N secondary cell groups; that is, each of the N bits corresponds to a target operation of a BWP of one secondary cell, or each of the N bits corresponds to a target operation of a BWP of one secondary cell group. Optionally, a first part of bits in the N bits may correspond to a target operation of a BWP of one secondary cell group, and a second part of bits may correspond to a target operation of a BWP of one secondary cell. The N bits include at least one first part of bits and at least one second part of bits.

Optionally, the first signaling may DCI of a PS-RNTI scrambling a CRC; and optionally, the first signaling has a wake up function.

Optionally, the terminal may receive the first signaling during outside active time, where the first signaling is used for indicating that the terminal wakes up in the next DRX-ON, performs PDCCH monitoring, and prepares to receive or transmits data; or the first signaling is used for indicating that the terminal does not wake up, does not start an OnDurationTimer, and maintains the DRX-OFF state. Optionally, the above outside active time may be discontinuous outside active time.

After the first signaling is received, the terminal performs S102 in the following manners. For example, when the terminal receives the first signaling from the base station during the outside active time of the primary cell, and the first signaling may only be directed to one terminal, N bits in the first signaling may be used for indicating the first power consumption behavior or the second power consumption behavior of the terminal on the secondary cell, where a value range of N is 0 to 15. Optionally, the first signaling may be directed to a group of terminals, each terminal in the group of terminals corresponds to N bits in the first signaling, and the N bits are used for indicating the first power consumption behavior or the second power consumption behavior of the terminal on the secondary cell, where a value range of N may be 0 to 15. Optionally, a value of N may be configured by the high-layer or determined by high-layer signaling.

Optionally, when the first signaling indicates wake-up and non-wake-up, the value of N in the first signaling is different. Optionally, when the first signaling indicates non-wake-up, N is 0.

Optionally, each bit value of in N bits has two states, for example, a bit value of 1 represents a state 1, and a bit value of 0 represents a state 2; or a bit value of 0 represents a state 1, and a bit value of 1 represents a state 2.

Optionally, the value of each bit in the N bits is 1 and 0, respectively, which may indicate the first power consumption behavior of the secondary cell corresponding to each bit and the second power consumption behavior of the secondary cell corresponding to each bit, respectively, or the value of each bit in the N bits is 1 and 0, respectively, which may indicate the second power consumption behavior of the secondary cell corresponding to each bit and the first power consumption behavior of the secondary cell corresponding to each bit, respectively. Optionally, the value of each bit in the N bits is 1 and 0, respectively, which may indicate that the secondary cell of the terminal corresponding to each bit maintains the current state and reverses the current state. For example, the secondary cell maintains the first power consumption behavior or the second power consumption behavior, or the secondary cell switches from the first power consumption behavior to the second power consumption behavior, or the secondary cell switches from the second power consumption behavior to the first power consumption behavior. Optionally, the value of each bit in the N bits is 1 and 0, respectively, which may indicate that the secondary cell of the terminal corresponding to each bit reverses the current state and maintains the current state. Optionally, a bit value of N bits is 0, which may not represent anything.

Optionally, the switching between the first power consumption behavior and the second power consumption behavior may be achieved by switching the state of the BWP.

When the base station indicates that the secondary cell or secondary cell group corresponding to one bit is the first power consumption behavior, the terminal may switch from the second power consumption state to the first power consumption state. Optionally, when only one BWP is configured with the first power consumption state, the terminal may switch to the first power consumption state; optionally, when a plurality of BWPs are configured with the first power consumption state, the terminal preferentially performs on the same BWP; optionally, the terminal may switch from the second power consumption BWP to the first power consumption BWP; optionally, when the terminal configures only one first power consumption BWP, the terminal switches to the configured first power consumption BWP; optionally, when the terminal configures a plurality of first power consumption BWPs, the terminal switches to the first power consumption BWP with the largest BWP identity in default; optionally, the terminal may switch to the first power consumption BWP with the smallest BWP identity; and optionally, the terminal may switch to a predefined first power consumption BWP configured by the high-layer.

When the base station indicates that the secondary cell or secondary cell group corresponding to one bit is the second power consumption behavior, if the terminal detects that the BWP receiving the first signaling is in the first power consumption state of the BWP, then the terminal directly switches to the second power consumption state of the BWP; and optionally, if the terminal detects that the BWP receiving the first signaling is the first power consumption BWP, the terminal switches to the second power consumption BWP. When there are a plurality of second power consumption BWPs, optionally, the terminal switches to a predefined BWP configured by the high-layer; optionally, the terminal switches to the default BWP; optionally, the terminal switches to the second power consumption BWP with the largest BWP identity in default; optionally, the terminal switches to the second power consumption BWP with the smallest BWP identity in default; optionally, the terminal may switch to the second power consumption BWP corresponding to the next BWP identity, such as in a cycle manner of 1, 2, 3, 0, 1 . . . ; optionally, the terminal may switch to the BWP where data was received or transmitted last time; optionally, the terminal may switch to the second power consumption BWP configured with the maximum bandwidth; optionally, the terminal may switch to the second power consumption BWP with the most MIMO; and optionally, the terminal may switch to the second power consumption BWP with the minimum PDCCH monitoring periodicity.

If the terminal achieves the switching between the first power consumption behavior and the second power consumption behavior by switching the BWP, and a state of the current secondary cell is already a state indicated by the first signaling, i.e. a state corresponding to the target operation, optionally, the terminal restarts a bwp-InactivityTimer of the secondary cell; optionally, the terminal stops counting of the bwp-InactivityTimer of the secondary cell; and optionally, the terminal ignores the indication of N bits in the first signaling and does not perform any operation.

Optionally, when the first signaling indicates non-wake-up and does not start the OnDurationTimer, the indication of N bits is not enabled.

Optionally, the secondary cells or the secondary cell groups corresponding to N bits are configured by the high-layer; and optionally, the secondary cells or the secondary cell groups corresponding to N bits are divided according to a certain rule. For example, grouping is performed according to the parity of the identity of the serving cell, or grouping is performed according to the size of the identity of the serving cell.

Exemplarily, table 1 shows a corresponding relationship between the number of bits and the secondary cell of the terminal or the secondary cell group of the terminal.

TABLE 1

| Number of bits | A corresponding relationship between the number of bits and the secondary cell or the secondary cell group |
|---|---|
| 1 | Optionally, this bit corresponds to all active secondary cells.<br>Optionally, this bit corresponds to part of secondary cell (one secondary cell group) configured by a radio resource control (RRC).<br>Optionally, this bit corresponds to a secondary cell whose parity of the cell identity is the same as the parity of an identity of the slot at which the first signaling is received.<br>Optionally, this bit corresponds to a secondary cell whose parity of the cell identity is the same as the parity of an identity of a control resource set (CORESET) at which the first signaling is received.<br>Optionally, this bit corresponds to a secondary cell whose parity of the cell identity is the same as the parity of an identity of a search space where the first signaling is received. |
| 2 | Optionally, this bit corresponds to two secondary cell groups configured by the RRC, separately.<br>Optionally, a high bit of a bit indication field corresponds to secondary cells whose cell identities are odd, and a low bit of the bit indication field corresponds to secondary cells whose cell identities are even.<br>Optionally, a high bit of a bit indication field corresponds to secondary cells whose cell identities are even, and a low bit of the bit indication field corresponds to secondary cells whose cell identities are odd.<br>Optionally, arranged from small to large according to the cell identities, a high bit of a bit indication field corresponds to secondary cells with the cell identities at the front n/2, and a low bit of the bit indication field corresponds to secondary cells with the cell identities at the back n/2 (n is the number of active cells, when n is odd, optionally n = n + 1; and optionally n = n − 1).<br>Optionally, arranged from small to large according to the cell identities, a high bit of a bit indication field corresponds to secondary cells with the cell identities at the back n/2, and a low bit of the bit indication field corresponds to secondary cells with the cell identities at the front n/2 (n is the number of active cells, when n is odd, optionally n = n + 1; and optionally n = n − 1). |

In another example, the base station configures a DRX related parameter for the terminal and configures a plurality of cells for the terminal.

Optionally, the base station configures the first power consumption BWP and the second power consumption BWP for the terminal. Optionally, the first power consumption BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above first power consumption BWP is sparser than the monitoring periodicity of the control channel configured by the second power consumption BWP.

Optionally, the base station may configure the first power consumption state for one or more BWPs of the terminal, where the first power consumption state is a special state other than the second power consumption state and a third power consumption state. Optionally, when the BWP is in the first power consumption state, the BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above BWP in the first power consumption state is sparser than the monitoring periodicity of the control channel configured by the BWP in the second power consumption state.

Optionally, sparse monitoring of the control channel may be a monitoring of the control channel with a larger monitoring periodicity. For example, once monitoring is performed in each 1280 slots.

Optionally, in S101, the first signaling may be first signaling transmitted by the base station to the primary cell and the primary-secondary cell of the terminal. For example, the base station may transmit the first signaling to the primary cell of the terminal in a carrier aggregation (CA) scene, and the base station may transmit the first signaling to the primary cell and the primary-secondary cell of the terminal in a dual-connectivity (DC) scene.

Optionally, N bits in the first signaling may correspond to target operations of BWPs of N secondary cells; or N bits may correspond to target operations of BWPs of N secondary cell groups; that is, each of the N bits corresponds to a target operation of a BWP of one secondary cell, or each of the N bits corresponds to a target operation of a BWP of one secondary cell group. Optionally, a first part of bits in the N bits may correspond to a target operation of a BWP of one secondary cell group, and a second part of bits may correspond to a target operation of a BWP of one secondary cell. The N bits include at least one first part of bits and at least one second part of bits.

Optionally, the first signaling may DCI of a PS-RNTI scrambling a CRC; and optionally, the first signaling has a wake-up function.

Optionally, the terminal may receive the first signaling during outside active time, where the first signaling is used for indicating that the terminal wakes up in the next DRX-ON, performs PDCCH monitoring, and prepares to receive or transmits data; or the first signaling is used for indicating that the terminal does not wake up, does not start an OnDurationTimer, and maintains the DRX-OFF state. Optionally, the above outside active time may be discontinuous outside active time.

After the first signaling is received, the terminal performs S102 in the following manners. For example, when the terminal receives the first signaling from the base station during the outside active time of the primary cell, and the first signaling may be directed to one terminal, N bits in the first signaling may be used for indicating a target BWP identity on a cell. Optionally, the first signaling may be directed to a group of terminals, each terminal in the group of terminals corresponds to N bits in the first signaling, and the N bits are used for indicating a target BWP identity on a cell of terminal. Optionally, this cell may be all active cells, including a primary cell and a SCell. Optionally, this cell may be all active SCells. Optionally, this cell is a part of cells configured by the RRC. Optionally, this cell may be a cell whose parity of the cell identity is the same as the parity of an identifier of the slot at which the first signaling is received. Optionally, the cell may be a SCell whose parity of the cell identity is the same as the parity of an identifier of the slot at which the first signaling is received. Optionally, this cell may be a cell whose parity of the cell identity is the same as the parity of an identity of the CORESET at which the first signaling is received. Optionally, the cell may be a SCell whose parity of the cell identity is the same as the parity of an identity of the CORESET at which the first signaling is received.

Optionally, a value of N in the first signaling may be 2. Optionally, when the first signaling indicates wake-up and non-wake-up, the value of N is different. Optionally, when the first signaling indicates wake-up, the value of N is 2. Optionally, when the first signaling indicates non-wake-up, the value of N is 0.

Optionally, when the first signaling indicates non-wake-up to the terminal and does not start the OnDurationTimer, the bit indication field in the first signaling is not enabled.

Optionally, when the cell configures only one BWP, the cell ignores a bit indication.

Optionally, when the cell configures only one BWP, the current state of the BWP is switched. For example, the operation includes: switching from the first power consumption state to the second power consumption state, or switching from the second power consumption state to the first power consumption state.

Optionally, when the cell is configured with a plurality of BWPs, for example the number of the BWPs is greater than 2, there are the following conditions.

When the target BWP identity indicated by the first signaling is the same as a BWP identity activated by the current cell, optionally, the bwp-InactivityTimer is restarted on the cell; optionally, timing of the bwp-InactivityTimer is stopped on the cell; optionally, the current state of the BWP is switched, such as switched from the first power consumption state to the second power consumption state or switched from the second power consumption state to the first power consumption state; and optionally, the cell ignores this indication of the first signaling and does not perform any operation.

When the target BWP identity indicated by the first signaling is different from a BWP identity activated the current cell, and the BWP identity indicated by the first signaling does not exceed a BWP configuration of the current cell, the cell switches from the currently activated BWP to the target BWP indicated by the first signaling.

When the target BWP identity indicated by the first signaling is different from a BWP identity activated the current cell, and the BWP identity indicated by the first signaling does not exceed a BWP configuration of the current cell, optional operations of the cell include the following.

Optionally, the cell ignores this indication of the first signaling and does not perform any operation. Optionally, the cell switches to a BWP corresponding to the configured maximum BWP identity, that is, the target BWP identity on the cell is the BWP identity indicated by the first signaling and a smaller identity in the maximum BWP identities of the current cell. For example, two BWPs are configured on the cell 1, and the corresponding decimal BWP identities are 0 and 1 respectively. If the decimal BWP identity indicated by the first signaling is 3, the target BWP identity of the cell 1 is 1, and the cell 1 should be switched to a BWP with the BWP identity of 1.

Optionally, the cell uses a high bit of a BWP binary indication field in the first signaling as the target BWP identity. For example, if the decimal BWP identity indicated by the first signaling is 3 and a binary of the BWP identity is indicated as '10', the high bit '1' is selected as the target BWP identity of the cell, and the cell switches to the BWP with the BWP identity of 1.

Optionally, the cell uses a low bit of a BWP binary indication field in the first signaling as the target BWP identity. For example, if the BWP identity indicated by the first signaling is 3 and a binary of the BWP identity is indicated as '10', the low bit '0' is selected as the target BWP identity of the cell, and the cell switches to the BWP with the BWP identity of 0.

Optionally, when the cell is configured with a plurality of BWPs, for example, the number of BWPs is greater than 2, the cell switches to a BWP with the larger BWP identity in the active BWPs.

In another example, the base station configures a DRX related parameter for the terminal and configures a plurality of cells for the terminal.

Optionally, the base station configures the first power consumption BWP and the second power consumption BWP for the terminal. Optionally, the first power consumption BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above first power consumption BWP is sparser than the monitoring periodicity of the control channel configured by the second power consumption BWP.

Optionally, the base station may configure the first power consumption state for one or more BWPs of the terminal, where the first power consumption state is a special state other than the second power consumption state and a third power consumption state. Optionally, when the BWP is in the first power consumption state, the BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above BWP in the first power consumption state is sparser than the monitoring periodicity of the control channel configured by the BWP in the second power consumption state.

Optionally, sparse monitoring of the control channel may be a monitoring of the control channel with a larger monitoring periodicity. For example, once monitoring is performed in each 1280 slots.

Optionally, in S101, the first signaling may be first signaling transmitted by the base station to the primary cell and the primary-secondary cell of the terminal. For example, the base station may transmit the first signaling to the primary cell of the terminal in a carrier aggregation (CA) scene, and the base station may transmit the first signaling to the primary cell and the primary-secondary cell of the terminal in a dual-connectivity (DC) scene.

Optionally, the first signaling may direct to only one terminal, may also direct to a group of terminals, that is, each of N bits corresponds to the target operation of the BWP of one secondary cell, or each of N bits corresponding to the target operation of the BWP of one secondary cell group.

Optionally, the first signaling may DCI of a PS-RNTI scrambling a CRC; and optionally, the first signaling has a wake-up function.

Optionally, the terminal may receive the first signaling during outside active time, where the first signaling is used for indicating that the terminal wakes up in the next DRX-ON, performs PDCCH monitoring, and prepares to receive or transmits data; or the first signaling is used for indicating that the terminal does not wake up, does not start an OnDurationTimer, and maintains the DRX-OFF state. Optionally, the above outside active time may be discontinuous outside active time.

After the first signaling is received, the terminal performs S102 in the following manners. For example, when the terminal receives the first signaling from the base station during the outside active time of the primary cell, and the first signaling may be directed to one terminal, N bits in the first signaling may be used for indicating a target cell identity. Optionally, the first signaling may be directed to a group of terminals, each terminal in the group of terminals corresponds to N bits in the first signaling, and the N bits are used for indicating a target cell identity of the terminal. The terminal, according to a target cell indicated by N bits in the first signaling, may perform the operation on the BWP of the secondary cell on the target cell.

Optionally, the N bits in the first signaling includes N1 bits and N2 bits, where the N1 bits may be used for indicating a target cell identity, and the N2 bits may be used for indicating a target operation on the BWP of the serving cell. A value of N1 may be 3, and a value of N2 may be 0. Optionally, when the first signaling indicates wake-up and non-wake-up, the value of N is different. Optionally, when the first signaling indicates wake-up, the value of N is 3. Optionally, when the first signaling indicates non-wake-up, the value of N is 2. That is, the value of N is equal to the value of N1.

Optionally, the terminal performs an operation on a SCell having the same cell identity as the cell identity indicated by the first signaling, for example, the operation is switching to the first power consumption behavior. Optionally, the terminal switches to the first power consumption behavior on an active SCell whose cell identity is less than (or less than or equal to) the cell identity indicated by the first signaling. Optionally, the terminal switches to the first power consumption behavior on an active SCell whose cell identity is greater than (or greater than or equal to) the cell identity indicated by the first signaling.

Optionally, other cells except a cell indicated by the first signaling maintain in an original state. Optionally, other cells except a cell indicated by the first signaling switch to the second power consumption behavior.

Optionally, when the first signaling indicates non-wake-up to the terminal and does not start the OnDurationTimer, the bit indication field in the first signaling is not enabled.

Optionally, when the number of cells configured by the terminal is greater than the number of cells indicated by the bit indication field, that is, when the number of cells configured by the terminal is greater than 8, the cells are grouped, and a cell group is indicated according to the parity of the identifier of the slot at which the first signaling is received.

Optionally, when the number of cells is greater than 8, the SCells are divided into two groups. When the number of cells is greater than 8 and less than or equal to 16, SCells whose cell identity is less than or equal to 7 are in one group (group 1), and SCells whose cell identity is greater than 7 and less than or equal to 15 are in the other group (group 2). When the number of cells is greater than 16 and less than or equal to 32, SCells whose cell identity is less than or equal to 15 constitute the group 1, and SCells whose cell identity is greater than 15 and less than or equal to 31 constitute the group 2. Optionally, when the identifier of the slot at which the first signaling is received is odd, the cell identity indicated by the first signaling is used for indicating a cell operation of the group 1. When the identity of the slot at which the first signaling is received is even, the cell identity indicated by the first signaling is used for indicating a cell operation of the group 2. Optionally, when the identifier of the slot at which the first signaling is received is even, the cell identity indicated by the first signaling is used for indicating a cell operation of the group 1. When the identifier of the slot at which the first signaling is received is odd, the cell identity indicated by the first signaling is used for indicating a cell operation of the group 2. Optionally, when the cell identity indicated by the first signaling is used for indicating the cell operation of the group 2, a corresponding relationship is that: when the number of cells is less than or equal to 16, the actual used cell identity is the cell identity indicated by the first signaling+8; and when the number of cells is greater than 16, the actual used cell identity is the cell identity indicated by the first signaling+16. For example, the terminal has a total of 14 cells, when the identifier of the slot at which the first signaling is received is even, which is used for indicating the cell operation of the group 2, the 3-bit indication field is "011", and its corresponding decimal cell identity is 3, for the group 2, its actual used cell identity is 3+8=11. The terminal switches to the first power consumption behavior on an active SCell, in the group 2, whose cell identity is less than or equal to 11. The terminal switches to the first power consumption behavior on the SCells whose cell identities are 8, 9, 10 and 11.

Optionally, the terminal performs the switching between the second power consumption BWP and the first power consumption BWP, which normally monitor a PDCCH, to achieve the switching between the second power consumption behavior and the first power consumption behavior. Optionally, the terminal performs the switching between the first power consumption state and the second power consumption state, which normally monitor a PDCCH on the BWP, to achieve the switching between the first power consumption behavior and the second power consumption behavior.

If the terminal achieves the switching between the first power consumption behavior and the second power consumption behavior by switching the BWP, and a state of the current SCell is the same as a behavior indicated by the bit indication field, for example, the behavior is the first power consumption behavior or the second power consumption behavior, optionally, the terminal restarts a bwp-InactivityTimer of the SCell; optionally, the terminal stops timing of the bwp-InactivityTimer of the SCell; and optionally, the terminal ignores the bit indication in the first signaling and does not perform any operation. If the terminal achieves the switching between the first power consumption behavior and the second power consumption behavior by the BWP switching, and the state of the current SCell and the behavior of the bit indication field indication are different, a switching operation of the BWP is performed on the current SCell to switch from the first power consumption BWP to the second power consumption BWP. When there are a plurality of BWPs with the same type, such as a plurality of first power consumption BWPs or a plurality of power consumption BWPs, optionally, the terminal may switch to a predefined BWP; optionally, the terminal may switch to a BWP designated by the base station, optionally, the terminal may switch to a default BWP; optionally, the terminal may switch to the BWPs with the same type and with the smallest BWP identity; optionally, the terminal may switch to the BWPs with the same type and with the largest BWP identity. Optionally, the BWPs with the same type and having the next BWP identity may be switched to, such as in a cycle manner of 1, 2, 3, 0, 1 . . . ; optionally, the BWP where data was received or transmitted last time may be switched to; optionally, the BWPs with the same type and configured with the maximum bandwidth may be switched to; optionally, the BWPs with the same type and having the most number of MIMO layers may be switched to; and optionally, the BWPs with the same type and having the minimum PDCCH monitoring periodicity may be switched to.

If the terminal achieves the operation performed on the BWP of the secondary cell on the target cell by switching the state of the BWP, and a state of the current SCell is the same as a state indicated by the bit indication field, optionally, the terminal starts/restarts a timer indicating that the state of the BWP is switched on the SCell; optionally, the terminal stops timing of a timer indicating that the state of the BWP is switched on the SCell; and optionally, the terminal ignores the bit indication in the first signaling and does not perform any operation.

In another example, the base station configures a DRX related parameter for the terminal and configures a plurality of cells for the terminal.

Optionally, the base station configures the first power consumption BWP and the second power consumption BWP for the terminal. Optionally, the first power consumption BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above first power consumption BWP is sparser than the monitoring periodicity of the control channel configured by the second power consumption BWP.

Optionally, the base station may configure the first power consumption state for one or more BWPs of the terminal, where the first power consumption state is a special state other than the second power consumption state and a third power consumption state. Optionally, when the BWP is in the first power consumption state, the BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above BWP in the first power consumption state is sparser than the monitoring periodicity of the control channel configured by the BWP in the second power consumption state.

Optionally, sparse monitoring of the control channel may be a monitoring of the control channel with a larger monitoring periodicity. For example, once monitoring is performed in each 1280 slots.

Optionally, in S101, the first signaling may be first signaling transmitted by the base station to the primary cell and the primary-secondary cell of the terminal. For example, the base station may transmit the first signaling to the primary cell of the terminal in a carrier aggregation (CA) scene, and the base station may transmit the first signaling to the primary cell and the primary-secondary cell of the terminal in a dual-connectivity (DC) scene.

Optionally, the first signaling may direct to only one terminal, may also direct to a group of terminals, that is, each of N bits corresponds to the target operation of the BWP of one secondary cell, or each of N bits corresponding to the target operation of the BWP of one secondary cell group.

Optionally, the first signaling may DCI of a PS-RNTI scrambling a CRC; and optionally, the first signaling has a wake-up function.

Optionally, the terminal may receive the first signaling during outside active time, where the first signaling is used for indicating that the terminal wakes up in the next DRX-ON, performs PDCCH monitoring, and prepares to receive or transmits data; or the first signaling is used for indicating that the terminal does not wake up, does not start an OnDurationTimer, and maintains the DRX-OFF state. Optionally, the above outside active time may be discontinuous outside active time.

After the first signaling is received, the terminal performs S102 according to the indication of the first signaling. For example, when the terminal receives the first signaling from the base station during the outside active time of the primary cell, and the first signaling may be directed to one terminal, N bits in the first signaling are used for indicating the first power consumption behavior of the terminal on the SCell. Optionally, the first signaling may be directed to a group of terminals, each terminal in the group of terminals corresponds to N bits in the first signaling, and the N bits are used for indicating an operation of the terminal on the SCell.

Optionally, the N bits in the first signaling includes N1 bits and N2 bits, where the N1 bits may be used for indicating a target cell identity, and the N2 bits may be used for indicating a target operation on the BWP of the serving cell. Optionally, when the first signaling indicates wake-up and non-wake-up, the value of N is different, where the value of N may be 4, the value of N1 may be 3, and the value of N2 may be 2. High three bits in four bits may be used for indicating the target cell identity, a low one bit may be used for indicating the operation of the terminal on the target cell. Optionally, a high one bit in four bits may be used for indicating the operation of the terminal on the target cell, and low three bits in four bits may be used for indicating the target identity.

Optionally, the target cell may be a SCell whose cell identity is the same as the cell identity indicated by the first signaling; optionally, the target cell may be an active SCell whose cell identity is less than (or less than or equal to) the cell identity indicated by the first signaling; and optionally, the target cell is an active SCell whose cell identity is greater than (or greater than or equal to) the cell identity indicated by the first signaling.

Optionally, when the number of cells configured by the terminal is greater than the number of cells indicated by the bit indication field, that is, when the number of cells configured by the terminal is greater than 8, the cells are grouped, and an operation is performed on a cell group according to the parity of the identifier of the slot at which the first signaling is received.

Optionally, when the number of cells is greater than 8, the SCells are divided into two groups, respectively group 1 and group 2. When the number of cells is greater than 8 and less than or equal to 16, SCells whose cell identity is less than or equal to 7 are in the group 1, and SCells whose cell identity is greater than 7 and less than or equal to 15 are in the group 2. When the number of cells is greater than 16 and less than or equal to 32, SCells whose cell identity is less than or equal to 15 are in the group 1, and SCells whose cell identity is greater than 15 and less than or equal to 31 are in the group 2. Optionally, when the identifier of the slot at which the first signaling is received is odd, the cell identity indicated by the first signaling is used for selecting a target cell in the group 1. When the identifier of the slot at which the first signaling is received is even, the cell identity indicated by the first signaling is used for selecting a target cell in the group 2. Optionally, when the identifier of the slot at which the first signaling is received is even, the cell identity indicated by the first signaling is used for selecting a target cell in the group 1. When the identifier of the slot at which the first signaling is received is odd, the cell identity indicated by the first signaling is used for selecting a target cell in the group 2. Optionally, when the cell identity indicated by the first signaling is used for selecting the target cell in the group 2, a corresponding relationship is that: when the number of cells is less than or equal to 16, the actual used cell identity is the cell identity indicated by the first signaling+8; and when the number of cells is greater than 16, the actual used cell identity is the cell identity indicated by the first signaling+16. For example, the terminal has a total of 14 cells, when the identifier of the slot at which the first signaling is received is even, which is used for selecting the target cell in the group 2, the 3-bit indication field is "011", and its corresponding decimal cell identity is 3, for the group 2, its actual used cell identity is 3+8=11, and in the group 2, the active SCells whose cell identity is less than or equal to 11 are selected as the target cells. That is, the selected target cells are SCells whose cell identities are 8, 9, 10 and 11.

Optionally, 1-bit value indicated the first power consumption behavior has two states, for example, 1-bit value of 1 represents a state 2, and 1-bit value of 0 represents a state 1; or 1-bit value of 0 represents a state 1, and 1-bit value of 1 represents a state 2.

Optionally, 1-bit value indicating the first power consumption behavior is 1 and 0, respectively, which respectively indicate that the target operation on the BWP of the secondary cell is the first power consumption behavior and the second power consumption behavior. Optionally, 1-bit value indicating that the target operation is the first power consumption behavior is 1 and 0, respectively, which respectively indicate the terminal to perform the first power consumption behavior and the second power consumption behavior on the target SCells. Optionally, 1-bit value indicating that the target operation is the first power consumption behavior is 1 and 0, respectively, which respectively indicate the terminal to maintain and reverse the current behavior on the target SCells. For example, the current first power consumption behavior or the current second power consumption behavior is maintained, and the current first power consumption behavior is switched to the second power consumption behavior, or the current second power consumption behavior is switched to the first power consumption behavior. Optionally, the terminal performs the switching between the second power consumption BWP and the first power consumption BWP, which normally monitor a PDCCH, to achieve the target operation on the BWP of the secondary cell. Optionally, the terminal performs the switching between the second power consumption state and the first power consumption state, which normally monitor a PDCCH on the BWP, to achieve the target operation on the BWP of the secondary cell. Optionally, a value of a bit in the bit indication field is 0, which has no specific meaning.

If the terminal achieves the switching between the first power consumption behavior and the second power consumption behavior by switching the BWP, and a behavior of the current SCell is the same as a behavior indicated by the bit indication field, optionally, the terminal restarts a bwp-InactivityTimer of the SCell; optionally, the terminal stops timing of the bwp-InactivityTimer of the SCell; and optionally, the terminal ignores the bit indication and does not perform any operation. If the terminal achieves the switching between the first power consumption behavior and the second power consumption behavior by switching the BWP, and the state of the current SCell and the behavior of the bit indication field indication are different, a BWP switching is performed on the current SCell to switch from the first power consumption BWP to the second power consumption BWP. When there are a plurality of BWPs with the same type, such as a plurality of first power consumption BWPs or a plurality of second power consumption BWPs, optionally, a predefined BWP is switched to. Optionally, a BWP designated by the base station is switched to. Optionally, a default BWP is switched to. Optionally, BWPs with the same type and having the minimum BWP identity may be switched to. Optionally, BWPs with the same type and having the maximum BWP identity may be switched to. Optionally, BWPs with the same type and having the next BWP identity (cyclically, for example, 1, 2, 3, 0, 1 . . . ) may be switched to, such as in a cycle manner of 1, 2, 3, 0, 1 . . . . Optionally, the BWP where data was received/transmitted last time may be switched to. Optionally, BWPs with the same type and configured with the maximum bandwidth may be switched to. Optionally, BWPs with the same type and configured with the most number of MIMO layers may be switched to. Optionally, BWPs with the same type and having the minimum PDCCH monitoring periodicity may be switched to.

If the terminal achieves the switching between the first power consumption behavior and the second power consumption behavior by switching the state of the BWP, and a behavior of the current SCell is the same as a behavior indicated by the bit indication field, optionally, the terminal starts/restarts a timer indicating that the state of the BWP is switched on the SCell; optionally, the terminal stops timing of a timer indicating that the state of the BWP is switched on the SCell; and optionally, the terminal ignores the bit indication in the first signaling and does not perform any operation.

Optionally, when the first signaling indicates non-wake-up to the terminal and does not start the OnDurationTimer, the indication field of the bits in the first signaling is not enabled.

In another example, the base station configures a DRX related parameter for the terminal and configures a plurality of cells for the terminal.

Optionally, the base station configures the first power consumption BWP and the second power consumption BWP for the terminal. Optionally, the first power consumption BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above first power consumption BWP is sparser than the monitoring periodicity of the control channel configured by the second power consumption BWP.

Optionally, the base station may configure the first power consumption state for one or more BWPs of the terminal, where the first power consumption state is a special state other than the second power consumption state and a third power consumption state. Optionally, when the BWP is in the first power consumption state, the BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above BWP in the first power consumption state is sparser than the monitoring periodicity of the control channel configured by the BWP in the second power consumption state.

Optionally, sparse monitoring of the control channel may be a monitoring of the control channel with a larger monitoring periodicity. For example, once monitoring is performed in each 1280 slots.

Optionally, in S101, the first signaling may be first signaling transmitted by the base station to the primary cell and the primary-secondary cell of the terminal. For example, the base station may transmit the first signaling to the primary cell of the terminal in a carrier aggregation (CA) scene, and the base station may transmit the first signaling to the primary cell and the primary-secondary cell of the terminal in a dual-connectivity (DC) scene.

Optionally, the first signaling may direct to only one terminal, may also direct to a group of terminals, that is, each of N bits corresponds to the target operation of the BWP of one secondary cell, or each of N bits corresponding to the target operation of the BWP of one secondary cell group.

Optionally, the first signaling may DCI of a PS-RNTI scrambling a CRC; and optionally, the first signaling has a wake-up function.

Optionally, the terminal may receive the first signaling during outside active time, where the first signaling is used for indicating that the terminal wakes up in the next DRX-ON, performs PDCCH monitoring, and prepares to receive or transmits data; or the first signaling is used for indicating that the terminal does not wake up, does not start an OnDurationTimer, and maintains the DRX-OFF state. Optionally, the above outside active time may be discontinuous outside active time.

After the first signaling is received, the terminal performs S102 according to the indication of the first signaling. For example, when the terminal receives the first signaling from the base station during the outside active time of the primary cell, and the first signaling may be directed to one terminal, N bits in the first signaling are used for indicating an operation of the BWP of the terminal on the SCell. Optionally, the first signaling may be directed to a group of terminals, each terminal in the group of terminals corresponds to N bits in the first signaling, and the N bits are used for indicating an operation of the BWP of the terminal on the SCell. Optionally, the operation of the BWP is a switching operation of the BWP. Optionally, the operation of the BWP is an operation switching the state of the BWP.

Optionally, the N bits in the first signaling includes N1 bits and N2 bits, where the N1 bits may be used for indicating a target cell identity, and the N2 bits may be used for indicating a target operation on the BWP of the serving cell. Optionally, when the first signaling indicates wake-up and non-wake-up, the value of N is different. Optionally, the value of N may be 5, the value of N1 may be 3, and the value of N2 may be 2. High three bits in five bits are used for indicating the target cell identity, and low two bit are used for indicating the target operation of the BWP of the secondary cell on the target cell; or, high two bit in five bits are used for indicating the target cell identity, and low three bits in five bits are used for indicating the target operation of the BWP of the secondary cell on the target cell.

Optionally, the target cell may be a SCell having the same cell identity as the cell identity indicated by the first signaling. Optionally, the target cell may be an active secondary cell whose cell identity is less than (or less than or equal to) the cell identity indicated by the first signaling. Optionally, the target cell may be an active secondary cell whose cell identity is greater than (or greater than or equal to) the cell identity indicated by the first signaling.

Optionally, when the number of cells configured by the terminal is greater than the number of cells indicated by the bit indication field, that is, when the number of cells configured by the terminal is greater than 8, the cells are grouped, and an operation is performed on a cell group according to the parity of the identifier of the slot at which the first signaling is received.

Optionally, when the number of cells is greater than 8, the SCells are divided into two groups, respectively group 1 and group 2. When the number of cells is greater than 8 and less than or equal to 16, SCells whose cell identity is less than or equal to 7 are in the group 1, and SCells whose cell identity is greater than 7 and far less than or equal to 15 are in the group 2. When the number of cells is greater than 16 and less than or equal to 32, SCells whose cell identity is less than or equal to 15 are in the group 1, and SCells whose cell identity is greater than 15 and less than or equal to 31 are in the group 2. Optionally, when the identifier of the slot at which the first signaling is received is odd, the cell identity indicated by the first signaling is used for selecting a target cell in the group 1. When the identifier of the slot at which the first signaling is received is even, the cell identity indicated by the first signaling is used for selecting a target cell in the group 2. Optionally, when the identifier of the slot at which the first signaling is received is even, the cell identity indicated by the first signaling is used for selecting a target cell in the group 1. When the identifier of the slot at which the first signaling is received is odd, the cell identity indicated by the first signaling is used for selecting a target cell in the group 2. Optionally, when the cell identity indicated by the first signaling is used for selecting the target cell in the group 2, a corresponding relationship is that: when the number of cells is less than or equal to 16, the actual used cell identity is the cell identity indicated by the first signaling+8; and when the number of cells is greater than 16, the actual used cell identity is the cell identity indicated by the first signaling+16. For example, the terminal has a total of 14 cells, when the identifier of the slot at which the first signaling is received is even, which is used for selecting the target cell in the group 2, the 3-bit indication field is "011", and its corresponding decimal cell identity is 3, for the group 2, its actual used cell identity is 3+8=11, and in the group 2, the active SCells whose cell identity is less than or equal to 11 are selected as the target cells. That is, the selected target cells are SCells whose cell identities are 8, 9, 10 and 11.

Optionally, when the target cell is configured with only one BWP, this cell ignores a bit indication in the first signaling. Optionally, when the target cell is configured with only one BWP, the current state of the BWP is switched to, such as switched from the first power consumption state to the second power consumption state, or switched from the second power consumption state to the first power consumption state.

Optionally, when the target cell is configured with a plurality of target cells, for example, the number of the target cells is greater than 2, there are the following conditions.

When the target BWP identity indicated by the first signaling is the same as a BWP identity activated by the current cell, optionally, the bwp-InactivityTimer is restarted on the cell; optionally, timing of the bwp-InactivityTimer is stopped on the cell; optionally, the current state of the BWP is switched to, such as switched from the first power consumption state to the second power consumption state or switched from the second power consumption state to the first power consumption state; and optionally, the terminal ignores this indication of the first signaling on the target cell and does not perform any operation.

When the target BWP identity indicated by the first signaling is different from a BWP identity activated the current cell, and the BWP identity indicated by the first signaling does not exceed a BWP configuration of the current cell, the target cell switches from the currently active BWP to the target BWP indicated by the first signaling.

When the target BWP identity indicated by the first signaling is different from a BWP identity activated the current cell, and the BWP identity indicated by the first signaling does not exceed a BWP configuration of the current cell, the target cell has the following optional operations.

Optionally, the terminal ignores this indication on the target cell and does not perform any operation.

Optionally, the terminal switches to a BWP corresponding to the configured maximum BWP identity on the target cell, that is, the target BWP identity on the target cell is a smaller identity between the BWP identity indicated by the first signaling and the maximum BWP identity of the current cell. For example, two BWPs are configured on the cell 1, and the corresponding decimal BWP identities are 0 and 1 respectively. If the decimal BWP identity indicated by the first signaling is 3, the target BWP identity of the cell 1 is 1, and the cell 1 should be switched to a BWP with the BWP identity of 1.

Optionally, the cell uses a high bit of a BWP binary indication field in the first signaling as the target BWP identity. For example, if the decimal BWP identity indicated by the first signaling is 3 and a binary of the BWP identity is indicated as '10', the high bit '1' is selected as the target BWP identity of the target cell, and the terminal switches to the BWP with the BWP identity of 1 on the target cell.

Optionally, the cell uses a low bit of a BWP binary indication field in the first signaling as the target BWP identity. For example, if the BWP identity indicated by the first signaling is 3 and a binary of the BWP identity is indicated as '10', the low bit '0' is selected as the target BWP identity of the target cell, and the terminal switches to the BWP with the BWP identity of 0 on the target cell.

In another example, the base station configures a DRX related parameter for the terminal and configures a plurality of cells for the terminal.

Optionally, the base station configures the first power consumption BWP and the second power consumption BWP for the terminal. Optionally, the first power consumption BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above first power consumption BWP is sparser than the monitoring periodicity of the control channel configured by the second power consumption BWP.

Optionally, the base station may configure the first power consumption state for one or more BWPs of the terminal, where the first power consumption state is a special state other than the second power consumption state and a third power consumption state. Optionally, when the BWP is in the first power consumption state, the BWP has the following characteristics: no monitoring of a control channel is configured or sparse monitoring periodicity of a control channel is configured, but a CSI measurement resource or a CSI report or an SRS resource is configured.

Optionally, the monitoring periodicity of the control channel configured by the above BWP in the first power consumption state is sparser than the monitoring periodicity of the control channel configured by the BWP in the second power consumption state.

Optionally, sparse monitoring of the control channel may be a monitoring of the control channel with a larger monitoring periodicity. For example, once monitoring is performed in each 1280 slots.

Optionally, in S101, the first signaling may be first signaling transmitted by the base station to the primary cell and the primary-secondary cell of the terminal. For example, the base station may transmit the first signaling to the primary cell of the terminal in a cell aggregation (CA) scene, and the base station may transmit the first signaling to the primary cell and the primary-secondary cell of the terminal in a dual-connectivity (DC) scene.

Optionally, the first signaling may direct to only one terminal, may also direct to a group of terminals, that is, each of N bits corresponds to the target operation of the BWP of one secondary cell, or each of N bits corresponding to the target operation of the BWP of one secondary cell group.

Optionally, the first signaling may DCI of a PS-RNTI scrambling a CRC; and optionally, the first signaling has a wake-up function.

Optionally, the terminal may receive the first signaling during outside active time, where the first signaling is used for indicating that the terminal wakes up in the next DRX-ON, performs PDCCH monitoring, and prepares to receive or transmits data; or the first signaling is used for indicating that the terminal does not wake up, does not start an OnDurationTimer, and maintains the DRX-OFF state. Optionally, the above outside active time may be discontinuous outside active time.

After the first signaling is received, the terminal performs S102 according to the indication of the first signaling. For example, when the terminal receives the first signaling from the base station during the outside active time of the primary cell, and the first signaling may be directed to one terminal, where when N is equal to 30, 30 bits in the first signaling may be used for indicating a target BWP identity of the terminal on each SCell. Optionally, the first signaling may be directed to a group of terminals, each terminal in the group of terminals corresponds to 30 bits in the first signaling, and the 30 bits are used for indicating a target BWP identity of the terminal on each SCell.

Optionally, every two bits in the 30 bits correspond to an operation of one SCell. Optionally, every two bits in the 30 bits are a group, and the 30 bits from the most significant bit (MSB) to the least significant bit (LSB) respectively correspond to secondary cell identities in ascending order. Optionally, every two bits in the 30 bits, are a group, and the 30 bits from the MSB to the LSB respectively correspond to secondary cell identities in descending order. Optionally, the 30 bits from the MSB to the LSB respectively correspond to the activated SCell identities in ascending order or the deactivated SCell identities in ascending order. Optionally, the 30 bits from the MSB to the LSB respectively correspond to the activated SCell identities in descending order or the deactivated SCell identities in descending order. Optionally, if the number of the currently activated SCells is less than 15, padding is performed on a corresponding position of the deactivated SCell. Optionally, if the number of currently activated SCells is less than 15, a bit of a corresponding position of the deactivated SCell is 0. Optionally, if the number of currently activated SCells is less than 15, a bit of a corresponding position of the deactivated SCell is empty.

Optionally, when the first signaling indicates the terminal to jump the next DRX-ON, the bit indication field is not enabled.

Optionally, when the cell is configured with only one BWP, this cell ignores a bit indication in the first signaling.

Optionally, when the cell is configured with only one BWP, the current state of the BWP is switched to, such as switched from the first power consumption state to the second power consumption state, or switched from the second power consumption state to the first power consumption state.

Optionally, when the cell is configured with a plurality of BWPs, for example, the number of the BWPs is greater than 2, there are the following conditions.

When the target BWP identity indicated by the first signaling is the same as a BWP identity activated by the current cell, optionally, the bwp-InactivityTimer is restarted on the cell. Optionally, timing of the bwp-InactivityTimer is stopped on the cell. Optionally, the current state of the BWP is switched to, such as switched from the first power consumption state to the second power consumption state or switched from the second power consumption state to the first power consumption state. Optionally, the cell ignores this indication of the first signaling and does not perform any operation.

When the target BWP identity indicated by the first signaling is different from a BWP identity activated the current cell, and the BWP identity indicated by the first signaling does not exceed a BWP configuration of the current cell, the cell switches from the currently activated BWP to the target BWP indicated by the first signaling.

When the target BWP identity indicated by the first signaling is different from a BWP identity activated the current cell, and the BWP identity indicated by the first signaling does not exceed a BWP configuration of the current cell, the cell ignores this indication of the first signaling and does not perform any operation.

In another example, the base station configures a DRX related parameter for the terminal and configures a plurality of cells for the terminal.

Optionally, in S101, the first signaling may be first signaling transmitted by the base station to the primary cell and the primary-secondary cell of the terminal. For example, the base station may transmit the first signaling to the primary cell of the terminal in a carrier aggregation (CA) scene, and the base station may transmit the first signaling to the primary cell and the primary-secondary cell of the terminal in a dual-connectivity (DC) scene.

Optionally, the first signaling may direct to only one terminal, may also direct to a group of terminals, that is, each of N bits corresponds to the target operation of the BWP of one secondary cell, or each of N bits corresponding to the target operation of the BWP of one secondary cell group.

Optionally, the first signaling may DCI of a PS-RNTI scrambling a CRC; and optionally, the first signaling has a wake-up function.

Optionally, the terminal may receive the first signaling during outside active time, where the first signaling is used for indicating that the terminal wakes up in the next DRX-ON, performs PDCCH monitoring, and prepares to receive or transmits data; or the first signaling is used for indicating that the terminal does not wake up, does not start an OnDurationTimer, and maintains the DRX-OFF state. Optionally, the above outside active time may be discontinuous outside active time.

After the first signaling is received, the terminal performs S102 in the following manners. Optionally, when the terminal receives the first signaling from the base station during the outside active time of the primary cell, and the first signaling may be directed to one terminal, N bits in the first signaling are used for indicating a binding relationship, of the terminal, between each secondary cell and the primary cell. Optionally, the first signaling may be directed to a group of terminals, each terminal in the group of terminals corresponds to N bits in the first signaling, and the N bits are used for indicating a binding relationship, of the terminal, between each secondary cell and the primary cell. A value range of N is greater than or equal to 0 and less than or equal to 15.

The binding relationship is that switching of part or all of the BWPs of the primary cell may cause a corresponding BWP switching on the secondary cell having the binding relationship. For example, when the primary cell is switched from the BWP1 to the BWP2, the secondary cell having the binding relationship with the primary cell is switched from the BWP3 to the BWP4.

The serial numbers of the BWPs in this embodiment are used for distinguishing different BWPs, and are not used for limiting a sequence or a label.

Optionally, the BWP2 and the BWP4 are BWPs having some common characteristics, such as a power saving characteristic, a data transmission rate characteristics, etc. For example, when the BWP2 is a dormant BWP, the BWP4 is a dormant BWP. For example, when the BWP2 is a default BWP, the BWP4 is a default BWP. For example, when the BWP2 is a BWP having the maximum data transmission rate, the BWP4 is a BWP with a maximum data transmission rate, etc.

Optionally, one bit in the first signaling is used for indicating a binding relationship between one secondary cell or one secondary cell group and the primary cell. For example, when N=1, N may indicate a binding relationship between one secondary cell or one secondary cell group and the primary cell; and when N=15, N may indicate a binding relationship between fifteen secondary cells or secondary cell groups and the primary cell. Optionally, No matter whether the secondary cell is activated, one bit corresponding to the activated secondary cell is always present. Alternatively, the terminal ignores a bit corresponding to an inactivated secondary cell. Alternatively, when the secondary cell is activated, one bit corresponding to the activated secondary cell exists. Alternatively, when the secondary cell is inactivated, no bit corresponding to the inactivated secondary cell exists.

Optionally, if the value of one bit in the first signaling is 0, which represents that a corresponding designated secondary cell has no binding relationship with the primary cell, and if the bit is 1, which represents that a corresponding designated secondary cell has a binding relationship with the primary cell. Optionally, if the bit is 0, which represents that a corresponding designated secondary cell has a binding relationship with the primary cell, and if the bit is 1, which represents that a corresponding designated secondary cell has no binding relationship with the primary cell.

When one bit indicates an operation of one secondary cell group, optionally, the secondary cell group is configured by the base station. Optionally, the secondary cell group uses a fixed cell identity grouping manner. For example, when N is 3, the secondary cells are divided into 3 groups according to the secondary cell identities, and each secondary cell group includes five secondary cells, no matter whether the secondary cells corresponding to the cell identities are activated, the grouping manner will not be changed. Optionally, the grouping manner is continuously divided according to the cell identities from small to large. For example, the group 1 includes the secondary cells with cell identities of 1 to 5, and so on. Alternatively, the grouping manner is cyclically divided according to the cell identities from small to large. For example, the group 1 includes secondary cells with cell identities of 1, 4, 7, 10 and 13, and the group 2 includes secondary cells with cell identities of 2, 5, 8, 11 and 14, and so on. Alternatively, the secondary cell group uses a grouping manner that a cell identity is not fixed. For example, when N is 3, if the number of currently activated secondary cells is less than or equal to 3, each bit corresponds to one secondary cell; and if the number of currently activated secondary cells is greater than 3 and less than or equal to 6, each bit corresponds to two secondary cells. Alternatively, the grouping manner is continuously divided according to identities, from small to large, of the activated secondary cells. Alternatively, the grouping manner is cyclically divided according to identities, from small to large, of the activated secondary cells.

Optionally, if N is 0, the terminal receives the first signaling, and which considers that all activated secondary cells have a binding relationship with the primary cell. Optionally, if N is 0, the terminal receives the first signaling, and which considers that all activated secondary cells have no binding relationship with the primary cell. Optionally, if N is 0, which secondary cells configured by RRC have a binding relationship.

Optionally, if N is 3 or 4, 3 bits or 4 bits indicate one cell identity, and the SCell corresponding to the cell identity has a binding relationship with the primary cell. Optionally, the SCell corresponding to the cell identity has a binding relationship with the primary cell. Optionally, a SCell whose cell identity is less than (or less than or equal to) a cell identity indicated by the first signaling has a binding relationship with the primary cell. Optionally, a SCell whose cell identity is greater than (or greater than or equal to) a cell identity indicated by the first signaling has a binding relationship with the primary cell. Optionally, when the indication field indicates all zeros (for example: "000" or "0000"), all activated Scells have no binding relationship with the primary cell in default.

Figure 2:
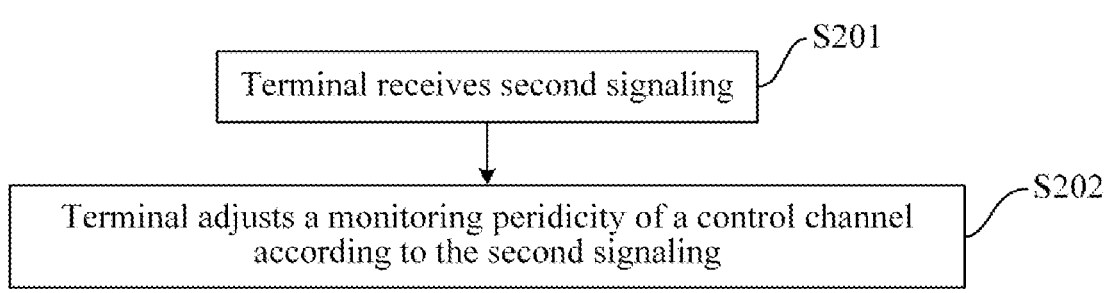
FIG. 2 is a flowchart of another signaling processing method according to an embodiment.

FIG. 2 is a flowchart of a signaling processing method according to an embodiment of the present application. As shown in FIG. 2, the method is applied to a terminal side and includes the following.

In S201, a terminal receives second signaling. In this embodiment, the second signaling is transmitted to the terminal by the base station. Optionally, the second signaling may include a bit indication field.

In S202, the terminal adjusts a monitoring periodicity of a control channel according to the second signaling.

After the second signaling is received, the terminal may adjust the monitoring periodicity of the control channel according to a specific indication of the bit indication field included in the second signaling. Optionally, the control channel in this embodiment may be a physical downlink control channel.

In an example, a bit indication field of the second signaling received in S201 may be used for indicating an index identifier of a minimum monitoring periodicity in a monitoring periodicity table of the terminal.

For example, the base station configures one or more cells for the terminal, and configures one minimum PDCCH monitoring periodicity table for each terminal. Optionally, this table may include a candidate minimum PDCCH monitoring periodicity and a corresponding offset.

Optionally, each monitoring periodicity option in the PDCCH minimum monitoring periodicity table may be the same as a "monitoringSlotPeriodicityAndOffset" option in a current protocol. That is, there are 15 options in the PDCCH minimum monitoring periodicity table, where the minimum monitoring periodicity is one slot, and the maximum monitoring periodicity may be 2560 slots.

Optionally, each monitoring periodicity option in the PDCCH minimum monitoring periodicity table may select a part of options of "monitoringSlotPeriodicityAndOffset" in the current protocol. For example, seven monitoring periodicity options are selected, and the seven monitoring periodicity options may be discontinuous options including one slot.

Optionally, the minimum monitoring periodicity indicated by the second signaling is the minimum monitoring periodicity corresponding to an index identifier indicated by the bit indication field in the second signaling, and may only be used for the primary cell. Optionally, the minimum monitoring periodicity indicated by the second signaling may be used for all activated secondary cells. Optionally, the minimum monitoring periodicity indicated by the second signaling may be used for the primary cell and all activated secondary cells. Optionally, the minimum monitoring periodicity indicated by the second signaling may be used for a designated serving cell configured by a RRC.

Optionally, the bit indication field in the above second signaling may include X (0≤X≤4) bits. Optionally, when X is 4, the PDCCH minimum monitoring periodicity table may include at most 16 monitoring periodicity candidate options. Optionally, when X is 3, the PDCCH minimum monitoring periodicity table may include at most 8 monitoring periodicity candidate options. Optionally, when X is 2, the PDCCH minimum monitoring periodicity table may include at most 4 monitoring periodicity candidate options. Optionally, when X is 1, the PDCCH minimum monitoring periodicity table may include at most 2 monitoring periodicity candidate options.

Optionally, when the bit indication field in the second signaling is indicated to be all 0, all 0 may be used for indicating an index identifier of which the minimum PDCCH monitoring periodicity is one slot. Optionally, when the bit indication field in the second signaling is indicated to be all 0, all 0 may be used for indicating an index identifier of the current monitoring periodicity of the terminal, that is, the currently used monitoring periodicity is not changed.

In a case of indicating by the second signaling, optionally, in S102, the terminal adjusts the monitoring periodicity of the control channel according to the second signaling, and exemplarily performs the following manners.

Manner one: when a PDCCH monitoring periodicity configured in a current search space is greater than, or greater than or equal to the minimum PDCCH monitoring periodicity indicated by the second signaling, the terminal continues to maintain the current monitoring periodicity unchanged.

Manner two: when a PDCCH monitoring periodicity configured in a current search space is less than the minimum PDCCH monitoring periodicity indicated by the second signaling, the terminal determines that the current search space is not enabled.

Manner three: when a PDCCH monitoring periodicity configured in a current search space is less than the minimum PDCCH monitoring periodicity indicated by the second signaling, the terminal adjusts the PDCCH monitoring periodicity configured in the current search space to the minimum PDCCH monitoring periodicity indicated by the second signaling, and performs monitoring based on the updated monitoring periodicity.

In the above manners, the PDCCH monitoring periodicity actually used by the terminal is a monitoring periodicity corresponding to the index identifier indicated by the second signaling and a larger monitoring periodicity among the currently used PDCCH monitoring periodicities.

Manner four: when a PDCCH monitoring periodicity configured in a current search space is equal to the minimum PDCCH monitoring periodicity indicated by the second signaling, the terminal does not adjust the current monitoring periodicity.

In an example, a bit indication field of the second signaling received in S201 may be used for indicating an index identifier of a monitoring periodicity used in a monitoring periodicity table of the search space.

For example, the base station configures one or more cells for the terminal, and configures one PDCCH monitoring periodicity table and an offset list for each search. Optionally, this table may include M PDCCH monitoring periodicities, and a value range of M is 0 to 15.

Optionally, the bit indication field in the second signaling may include X ($0 \leq X \leq 4$) bits. For example, the bit indication field in the second signaling received is "0011" which represents that the bit indication field in the second signaling indicates a monitoring periodicity with an index identifier of 3 in the monitoring periodicity table in the search space.

Optionally, the minimum monitoring periodicity indicated by the second signaling is the minimum monitoring periodicity corresponding to an index identifier indicated by the bit indication field in the second signaling, and may only be used for the primary cell. Optionally, the minimum monitoring periodicity indicated by the second signaling may be used for all activated secondary cells. Optionally, the minimum monitoring periodicity indicated by the second signaling may be used for the primary cell and all activated secondary cells. Optionally, the minimum monitoring periodicity indicated by the second signaling may be used for a designated cell configured by a RRC.

Optionally, when the bit indication field in the second signaling is indicated to be all 0 (such as "0000"), all 0 may be used for indicating the index identifier of the current monitoring periodicity of the terminal, that is, the current monitoring periodicity is not adjusted. Optionally, when the index identifier indicated by the bit indication field in the second signaling exceeds a PDCCH monitoring periodicity configuration in the current search space, the terminal may not adjust the current PDCCH monitoring periodicity in the search space. Optionally, when the index identifier indicated by the bit indication field in the second signaling exceeds the PDCCH monitoring periodicity configuration in the current search space, the terminal may use the maximum PDCCH monitoring periodicity configured by the base station.

Based on an indication meaning of the above second signaling, the terminal performs S202 to adjust the monitoring periodicity of the control channel.

In an example, the bit indication field of the second signaling received in S201 may be used for indicating an index identifier of the search space of the terminal.

For example, the base station configures one or more cells for the terminal, and issues the second signaling based on the configured cells.

Optionally, a bit length in the second signaling used for indicating the PDCCH monitoring periodicity may be X ($0 \leq X \leq 4$). Optionally, each bit in the bit indication field in the second signaling may be combined to indicate the index identifier of the search space of the terminal. Optionally, the bit indication field in the second signaling may be used for indicating the PDCCH monitoring periodicity.

Based on an indication of the bit indication field in the second signaling, in S202, there are the following manners for the terminal to adjust the monitoring periodicity of the control channel according to the second signaling.

A first optional manner the terminal uses a PDCCH monitoring periodicity used on a search space whose index identifier is the same as the index identifier of the search space indicated by the second signaling as the minimum monitoring periodicity.

A second optional manner if a PDCCH monitoring periodicity of other search space is greater than the minimum PDCCH monitoring periodicity indicated by the second signaling, the terminal maintains the original PDCCH monitoring periodicity unchanged.

A third optional manner if a PDCCH monitoring periodicity of other search space is less than the minimum PDCCH monitoring periodicity indicated by the second signaling, the corresponding other search space is not enabled.

A fourth optional manner if a PDCCH monitoring periodicity of other search space is less than the minimum PDCCH monitoring periodicity indicated by the second signaling, the terminal adjusts the current monitoring periodicity to the minimum PDCCH monitoring periodicity indicated by the second signaling. For example, when the index identifier of the search space indicated by the second signaling is 3, the terminal determines the PDCCH monitoring periodicity configured in the search space with index identifier of 3 as the adjusted PDCCH monitoring periodicity.

In the above manners, the PDCCH monitoring periodicity actually used by the terminal is a larger monitoring periodicity among the current PDCCH monitoring periodicities of each search space and the monitoring periodicity used by the search space indicated by the second signaling.

Figure 3:
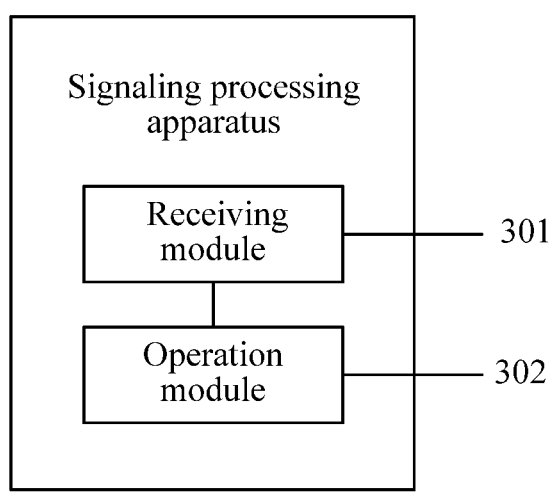
FIG. 3 is a structural diagram of a signaling processing apparatus according to an embodiment.

FIG. 3 is a structural diagram of a signaling processing apparatus according to an embodiment. As shown in FIG. 3, the apparatus may include a receiving module 301 and an operation module 302. The receiving module 301 is configured to receive first signaling, and the operation module 302 is configured to perform the operation on a BWP of a serving cell according to the first signaling. An operation process of the above operation module may be: performing the operation on the BWP of the serving cell according to the first signaling, or performing the operation on a state of the BWP of the serving cell according to the first signaling, or performing the operation on the BWP of the serving cell according to the first signaling when the above apparatus is configured with a first power consumption BWP and a first power consumption state of the BWP. The first signaling includes M bits, and the M bits are used for indicating a target operation on the BWP of the serving cell, where M is an integer. The target operation includes switching from a first power consumption behavior to a second power consumption behavior, or switching from a second power consumption behavior to a first power consumption behavior, or no behavior switching is performed.

In an example, the operation module may be used for performing the operation on the BWP of the serving cell according to the first signaling received in outside active time, this process may be: the operation module performs the operation on the BWP of the serving cell according to an indication of N bits in the first signaling received in the outside active time, or performing the operation on the BWP of the serving cell according to an indication of N bits in the first signaling received in the outside active time, where N is an integer.

Each of the N bits corresponds to a target operation of a BWP of one serving cell; or each of the N bits corresponds to a target operation of a BWP of one serving cell group; or a first part of bits in the N bits corresponds to a target operation of a BWP of one serving cell group, and a second part of bits in the N bits corresponds to a target operation of a BWP of one serving cell, where the N bits includes at least one first part of bits and at least one second part of bits.

In an example, the operation module may include a determination unit and an operation unit.

The determination unit is configured to determine a target cell according to an indication of a bit indication field in the first signaling received in the outside active time.

The operation unit is configured to perform the operation on the BWP of the serving cell on the target cell, where the bit indication field includes N1 bits and N2 bits, the N1 bits are used for indicating a target cell identity, and the N2 bits are used for indicating a target operation on the BWP of the serving cell.

In an example, the bit indication field in the first signaling received by the receiving module is used for indicating a binding relationship between a primary and a secondary cell. The operation module is configured to perform the operation on the BWP of the secondary cell according to the binding relationship.

Figure 4:
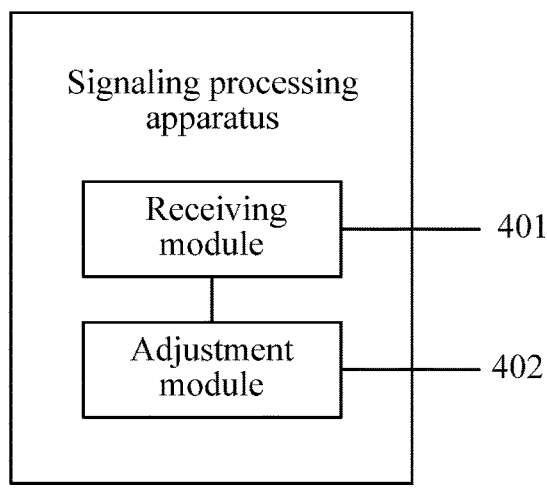
FIG. 4 is a structural diagram of another signaling processing apparatus according to an embodiment.

FIG. 4 is a structural diagram of another signaling processing apparatus according to an embodiment of the present application. As shown in FIG. 4, the apparatus may include a receiving module 401 and an adjustment module 402.

The receiving module is configured to receive second signaling.

The adjustment module is configured to adjust a monitoring periodicity of a control channel according to the second signaling.

In an example, a bit indication field of the second signaling is used for indicating an index identifier of a minimum monitoring periodicity in a monitoring periodicity table of the terminal, and the adjustment module is configured to adjust the monitoring periodicity of the control channel according to the index identifier indicated by the second signaling.

In an example, a bit indication field of the second signaling is used for indicating an index identifier of a search space of the terminal, and the adjustment module is configured to adjust the monitoring periodicity of the control channel according to the index identifier.

In an example, a bit indication field of the second signaling is used for indicating an index identifier of a monitoring periodicity used by the terminal in a monitoring periodicity table in a search space, and the adjustment module is configured to adjust the monitoring periodicity of the control channel according to the index identifier.

Figure 5:
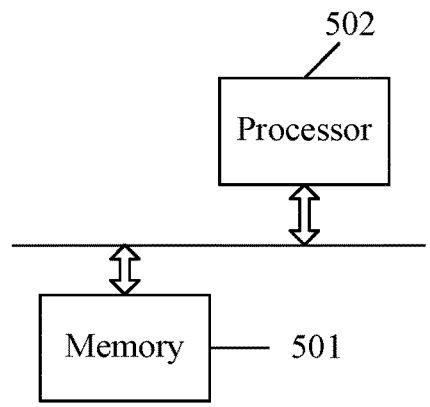
FIG. 5 is a structural diagram of a terminal according to an embodiment.
Figure 6:
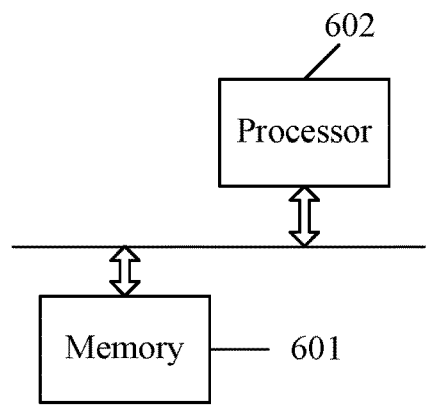
FIG. 6 is a structure diagram of a terminal according to an embodiment.

FIG. 5 is a structural diagram of a terminal according to an embodiment of the present application. As shown in FIG. 5, the terminal includes a processor 501 and a memory 502. One or more processors 501 may be provided in the terminal, and one processor 501 is used as an example in FIG. 5. The processor 501 and the memory 502 in the terminal may be connected through a bus or in other manners. In FIG. 6, the connection through the bus is used as an example.

As a computer-readable storage medium, the memory 502 may be configured to store software programs, computer-executable programs and modules, such as program instructions/modules (for example, the receiving module 301 and the operation module 302 in the signaling processing apparatus) corresponding to the signaling processing method in the present application shown in FIG. 1. The processor 501 performs the signaling processing method by running the software programs, instructions and modules stored in the memory 502.

The memory 502 may mainly include a program storage region and a data storage region, where the program storage region may store an operating system and an application program required by at least one function while the data storage region may store data created depending on use of a device. Additionally, the memory 502 may include a high-speed random-access memory and may also include a non-volatile memory such as at least one disk memory, a flash memory or another nonvolatile solid-state memory.

FIG. 6 is a structural diagram of a terminal according to an embodiment. As shown in FIG. 6, the terminal includes a processor 601 and a memory 602. One or more processors 601 may be provided in the terminal, and one processor 601 is used as an example in FIG. 6. The processor 601 and the memory 602 in the terminal may be connected through a bus or in other manners. In FIG. 6, the connection through the bus is used as an example.

As a computer-readable storage medium, the memory 602 may be configured to store software programs, computer-executable programs and modules, such as program instructions/modules (for example, the receiving module 401 and the adjustment module 402 in the signaling processing apparatus) corresponding to the signaling processing method in the present application shown in FIG. 2. The processor 601 performs the signaling processing method by running the software programs, instructions and modules stored in the memory 602.

The memory 602 may mainly include a program storage region and a data storage region, where the program storage region may store an operating system and an application program required by at least one function while the data storage region may store data created depending on use of a device. Additionally, the memory 602 may include a high-speed random-access memory and may also include a non-volatile memory such as at least one disk memory, a flash memory or another nonvolatile solid-state memory.

An embodiment of the present application further provides a storage medium including computer-executable instructions, and the computer-executable instructions are used for performing a signaling processing method when executed by a computer processor. The method includes: the terminal receives first signaling, and the terminal performs the operation on a BWP of a serving cell according to the first signaling.

An embodiment of the present application further provides a storage medium including computer-executable instructions, and the computer-executable instructions are used for performing a signaling processing method when executed by a computer processor. The method includes: the terminal receives second signaling, and the terminal adjusts a monitoring periodicity of a control channel according to the second signaling.

The above are only exemplary embodiments of the present application and are not intended to limit the scope of the present application.

It is to be understood by those skilled in the art that the term "terminal" covers any suitable type of radio UE, for example, a mobile phone, a portable data processing device, a portable web browser, or a vehicle-mounted mobile station.

In general, multiple embodiments of the present application may be implemented in hardware, dedicated circuits, software, logics or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of a downlink control information scheduling apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology, such as, but not limited to, a read only memory (ROM), a random-access memory (RAM) and an optical memory device and system (digital video disc (DVD) or compact disc (CD)). The computer-readable medium may include a non-transitory storage medium. The data processor may be in any type suitable for the local technical environment, for example, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

What is claimed is:

1. A method for wireless communication, comprising:
   receiving, by a terminal configured with a discontinuous receiving (DRX) mode, a first signaling with a cyclic redundancy check (CRC) scrambled by a power-saving (PS) radio network temporary identifier (RNTI) outside a DRX active time, wherein the first signaling comprises N bits, wherein each of the N bits corresponds to a group of serving cells, and wherein N is an integer; and
   performing, by the terminal, a bandwidth part (BWP) operation associated with a dormant BWP for a serving cell according to the first signaling, wherein the dormant BWP is from a plurality of configured BWPs and is configured by a high layer signaling,
   wherein the BWP operation comprises, in response to a bit of the N bits being equal to 1, leaving from the dormant BWP to a non-dormant BWP from the plurality of configured BWPs by switching, by the terminal, an active BWP of the serving cell to the non-dormant BWP, wherein the non-dormant BWP is configured by the high layer signaling,
   wherein the BWP operation further comprises, in response to the bit of the N bits being equal to 0, entering to the dormant BWP from the non-dormant BWP by switching, by the terminal, the active BWP of the serving cell to the dormant BWP.

2. The method of claim 1, wherein the BWP operation further comprises remaining in a current BWP without a BWP switching operation.

3. The method of claim 1, wherein the first signaling is received on a primary cell or a primary-secondary cell.

4. The method of claim 1, wherein the first signaling further carries a wake up indication indicating whether the terminal is to wake up in a next DRX cycle or not to start an onDurationTimer in the next DRX cycle.

5. A method for wireless communication, comprising:
   transmitting, by a base station, a first signaling with a cyclic redundancy check (CRC) scrambled by a power-saving (PS) radio network temporary identifier (RNTI) to a terminal configured with a discontinuous receiving (DRX) mode to enable the terminal to perform a bandwidth part (BWP) operation associated with a dormant BWP for a serving cell, wherein the dormant BWP is from a plurality of configured BWPs and is configured by a high layer signaling,
   wherein the first signaling is received by the terminal outside a DRX active time, wherein the first signaling comprises N bits, wherein each of the N bits corresponds to a group of serving cells, and wherein N is an integer,
   wherein a bit of the N bits being equal to 1 enables the terminal to perform the BWP operation of leaving from the dormant BWP to a non-dormant BWP from the plurality of configured BWPs by switching an active BWP of the serving cell to the non-dormant BWP wherein the non-dormant BWP is configured by the high layer signaling, and
   wherein the bit of the N bits being equal to 0 enables the terminal to perform the BWP operation of entering the dormant BWP from the non-dormant BWP by switching the active BWP of the serving cell to the dormant BWP.

6. The method of claim 5, wherein the BWP operation further comprises remaining in a current BWP without a BWP switching operation.

7. The method of claim 5, wherein the first signaling is received on a primary cell or a primary-secondary cell.

8. The method of claim 5, wherein the first signaling further carries a wake up indication indicating whether the terminal is to wake up in a next DRX cycle or not to start an onDurationTimer in the next DRX cycle.

9. A terminal configured with a discontinuous receiving (DRX) mode, comprising a memory, a processor, and a computer program stored in the memory, wherein the processor, when executing the computer program stored in the memory, is configured to:
- receive a first signaling with a cyclic redundancy check (CRC) scrambled by a power-saving (PS) radio network temporary identifier (RNTI) outside a DRX active time, wherein the first signaling comprises N bits, wherein each of the N bits corresponds to a group of serving cells, and wherein N is an integer; and
- perform a bandwidth part (BWP) operation associated with a dormant BWP for a serving cell according to the first signaling, wherein the dormant BWP is from a plurality of configured BWPs and is configured by a high layer signaling;
- wherein the BWP operation comprises, in response to a bit of the N bits being equal to 1, leaving from the dormant BWP to a non-dormant BWP from the plurality of configured BWPs by switching an active BWP of the serving cell to the non-dormant BWP, wherein the non-dormant BWP is configured by the high layer signaling, and
- wherein the BWP operation further comprises, in response to the bit of the N bits being equal to 0, entering to the dormant BWP from the non-dormant BWP by switching the active BWP of the serving cell to the dormant BWP.

10. The terminal of claim 9, wherein the processor is configured to perform the BWP operation by:
- remaining in a current BWP without a BWP switching operation.

11. The terminal of claim 9, wherein the first signaling is received on a primary cell or a primary-secondary cell.

12. The terminal of claim 9, wherein the first signaling further carries a wake up indication indicating whether the terminal is to wake up in a next DRX cycle or not to start an onDurationTimer in the next DRX cycle.

13. A base station for wireless communication, comprising a memory, a processor, and a computer program stored in the memory, wherein the processor, when executing the computer program stored in the memory, is configured to:
- transmit a first signaling with a cyclic redundancy check (CRC) scrambled by a power-saving (PS) radio network temporary identifier (RNTI) to a terminal configured with a discontinuous receiving (DRX) mode to enable the terminal to perform a bandwidth part (BWP) operation associated with a dormant BWP for a serving cell, wherein the dormant BWP is from a plurality of configured BWPs and is configured by a high layer signaling,
- wherein the first signaling is received by the terminal outside a DRX active time, wherein the first signaling comprises N bits, each of the N bits corresponding to a group of serving cells, and wherein N is an integer,
- wherein a bit of the N bits being equal to 1 enables the terminal to perform the BWP operation of leaving from the dormant BWP to a non-dormant BWP from the plurality of configured BWPs by switching an active BWP of the serving cell to the non-dormant BWP wherein the non-dormant BWP is configured by the high layer signaling, and
- wherein the bit of the N bits being equal to 0 enables the terminal to perform the BWP operation of entering the dormant BWP from the non-dormant BWP by switching the active BWP of the serving cell to the dormant BWP.

14. The base station of claim 13, wherein the BWP operation further comprises remaining in a current BWP without a BWP switching operation.

15. The base station of claim 13, wherein the first signaling is received on a primary cell or a primary-secondary cell.

16. The base station of claim 13, wherein the first signaling further carries a wake up indication indicating whether the terminal is to wake up in a next DRX cycle or not to start an onDurationTimer in the next DRX cycle.

* * * * *